(12) United States Patent
Joong et al.

(10) Patent No.: US 6,700,268 B2
(45) Date of Patent: Mar. 2, 2004

(54) ROTATIONAL ELECTRIC MACHINE AND A VEHICLE LOADED THEREWITH

(75) Inventors: Kim Houng Joong, Hitachi (JP); Satoru Okabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 09/942,037

(22) Filed: Aug. 30, 2001

(65) Prior Publication Data

US 2002/0117933 A1 Aug. 29, 2002

(30) Foreign Application Priority Data

Feb. 28, 2001 (JP) .......................... 2001-53920

(51) Int. Cl.⁷ .............................................. H02K 16/02
(52) U.S. Cl. ....................................... 310/114; 310/191
(58) Field of Search ................................ 310/191, 114, 310/112

(56) References Cited

U.S. PATENT DOCUMENTS

| | | | | |
|---|---|---|---|---|
| 3,233,133 A | * | 2/1966 | Kober .......................... 310/191 |
| 3,405,296 A | * | 10/1968 | Stilley et al. ............... 310/116 |
| 3,713,015 A | * | 1/1973 | Frister ......................... 322/28 |
| 4,305,031 A | * | 12/1981 | Wharton ...................... 322/29 |
| 4,782,257 A | * | 11/1988 | Secher et al. ............... 310/114 |
| 4,879,484 A | * | 11/1989 | Huss ........................... 310/114 |
| 4,882,513 A | * | 11/1989 | Flygare et al. ............... 310/114 |
| 5,132,604 A | * | 7/1992 | Shimane et al. ............... 322/10 |
| 5,200,659 A | * | 4/1993 | Clarke ......................... 310/112 |
| 5,300,848 A | * | 4/1994 | Huss et al. .................... 310/83 |
| 5,309,081 A | * | 5/1994 | Shah et al. ................... 322/10 |
| 6,191,561 B1 | * | 2/2001 | Bartel ......................... 322/51 |
| 6,373,160 B1 | * | 4/2002 | Schrodl ....................... 310/114 |

FOREIGN PATENT DOCUMENTS

| | | | | | |
|---|---|---|---|---|---|
| EP | 0798844 A1 | * | 1/1997 | | |
| EP | 0817359 A1 | * | 7/1998 | | |
| FR | 2191329 A1 | * | 1/1974 | | |
| GB | 2317997 A | * | 8/1998 | | |
| JP | 7298696 | | 11/1995 | | |
| JP | 9132042 | | 5/1997 | | |
| WO | WO 9939426 A1 | * | 8/1999 | ......... | H02K/16/02 |

* cited by examiner

*Primary Examiner*—Joseph Waks
(74) *Attorney, Agent, or Firm*—Crowell & Moring LLP

(57) ABSTRACT

A rotational electric machine in which a rotor having different-polarity field magnets arranged alternately in a rotational direction is divided axially into two rotor portions so that the axial position of one of the two rotor portions is changed relative to that of the other in accordance with a direction of torque of the rotor or the phase of synthesized magnetic poles of the field magnets is changed relative to that of magnetic poles of the other rotor portion in accordance with a direction of torque of the rotor, and a vehicle loaded with the rotational electric machine.

26 Claims, 21 Drawing Sheets

ROTATIONAL ELECTRIC MACHINE AND A VEHICLE LOADED THEREWITH

BACKGROUND OF THE INVENTION

The present invention relates to a rotational electric machine with an effective magnetic flux density variable in accordance with the rotational speed and a vehicle loaded therewith.

Induced electromotive force of a rotational electric machine, especially of a permanent-magnet type rotational electric machine mounted on a vehicle such as a hybrid car or an electric car, is determined on the basis of a constant magnetic flux density generated by permanent magnets disposed in a rotor and a rotational angular velocity of the rotational electric machine. That is, when the rotational angular velocity of the rotational electric machine increases, the induced electromotive force of the rotational electric machine increases in proportion to the rotational angular velocity. Hence, the permanent-magnet type rotational electric machine was able to obtain high torque power but was hardly operated in a high rotation region because the variable rotational velocity range of the machine was narrow. In the past, therefore, the high rotation region was widened by field weakening control.

Further, the conventional rotational electric machine was designed in accordance with the rotation region. Hence, when both low rotation region and high rotation region were required, rotational electric machines prepared to satisfy the regions respectively were used as described in JP-A-9-132042. Alternatively, both the drive mode and electric power generation mode were provided in one rotational electric machine so that one mode could be selected from the two modes as described in JP-A-7-298696.

SUMMARY OF THE INVENTION

The field weakening control in the background art was performed by a field weakening control current flowing in the windings of a stator. It was however necessary to raise the field weakening control current in accordance with the induced electromotive force which rose in proportion to the rotational angular velocity. Hence, heat generated in the stator windings increased. Hence, there was the possibility that lowering of efficiency in the rotational electric machine, demagnetization of permanent magnets owing to heating beyond cooling performance might occur in a high rotation region. If a plurality of rotational electric machines were prepared to satisfy the respective rotation regions, an electric power converter and a control unit were required for driving each of the rotational electric machines. This caused complication of system configuration and cost rise.

A typical object of the present invention is to provide a rotational electric machine in which high torque characteristic can be obtained in a low rotation region whereas high output power generation characteristic can be obtained in a high rotation region, and a vehicle loaded with the rotational electric machine.

Another typical object of the present invention is to provide a rotational electric machine in which high torque characteristic can be obtained in a low rotation region whereas high power generation characteristic can be obtained in a high rotation region and in which mechanical reliability can be improved, and a vehicle loaded with the rotational electric machine.

The present invention is basically characterized in that high torque characteristic and high power generation characteristic are obtained in a low rotation region and in a high rotation region respectively by mechanical control, that is, by controlling effective magnetic flux through dividing a rotor into two rotor portions. Specifically, a rotor having different-polarity field magnets arranged alternately in a rotational direction is divided into two axially separate portions. The axial position of one of the two rotor portions is changed relative to that of the other in accordance with a direction of torque of the rotor or the phase of synthesized magnetic poles of the field magnets is changed relative to that of magnetic poles of the other rotor portion in accordance with a direction of torque of the rotor. As a result, in the present invention, field weakening control can be performed even in the case where the stator windings are not supplied with any current. Moreover, according to the present invention, one of the two separate rotor portions is supported from axially opposite sides by a support mechanism to thereby relax the axially moving force of the one rotor portion.

Typical aspects of the present invention are as follows.

A rotational electric machine comprising: a stator having windings; and a split rotor rotatably disposed on an inner circumferential side of the stator through an air gap and axially divided into two rotor portions, the rotor portions having different-polarity field magnets disposed alternately in a rotational direction; one of the rotor portions including a changing mechanism for changing an axial position of the one rotor portion relative to an axial position of the other rotor portion in accordance with a direction of torque of the rotor; the one rotor portion being supported from axially opposite sides by a support mechanism.

A rotational electric machine comprising: a stator having windings; and a split rotor rotatably disposed on an inner circumferential side of the stator through an air gap and axially divided into two rotor portions, the rotor portions having different-polarity field magnets disposed alternately in a rotational direction; one of the rotor portions including a changing mechanism for changing a phase of synthesized magnetic poles of the field magnets relative to that of magnetic poles of the other rotor portion in accordance with a direction of torque of the rotor; the one rotor portion is supported from axially opposite sides by a support mechanism.

A rotational electric machine comprising: a stator having windings; and a split rotor rotatably disposed on an inner circumferential side of the stator through an air gap and axially divided into two rotor portions, the rotor portions having different-polarity field magnets disposed alternately in a rotational direction; one of the rotor portions including a changing mechanism for changing an axial position of the one rotor portion relative to that of the other rotor portion while shifting a magnetic pole center of the field magnets disposed in the one rotor portion and another magnetic pole center of the field magnets disposed in the other rotor portion in accordance with a direction of torque of the rotor, the one rotor portion being supported from axially opposite sides by a support mechanism.

A rotational electric machine comprising: a stator having windings; and a split rotor rotatably disposed on an inner circumferential side of the stator through an air gap and axially divided into two rotor portions, the rotor portions having different-polarity field magnets disposed alternately in a rotational direction; one of the rotor portions including a changing mechanism for changing a phase of synthesized magnetic poles of the field magnets relative to that of magnetic poles of the field magnets of the other rotor portion while shifting a magnetic pole center of the field magnets disposed in the one rotor portion and another magnetic pole center of the field magnets disposed in the other rotor portion in accordance with a direction of torque of the rotor, the one rotor portion being supported from axially opposite sides by a support mechanism.

A rotational electric machine comprising: a stator having windings; and a split rotor rotatably disposed on an inner circumferential side of the stator through an air gap and axially divided into two rotor portions, the rotor portions having different-polarity field magnets disposed alternately in a rotational direction; one of the rotor portions including a changing mechanism for changing an axial position of the one rotor portion relative to that of the other rotor portion while truing up a magnetic pole center of the field magnets disposed in the one rotor portion and another magnetic pole center of the field magnets disposed in the other rotor portion in accordance with a direction of torque of the rotor, the one rotor portion being supported from axially opposite sides by a support mechanism.

A rotational electric machine comprising: a stator having windings; and a split rotor rotatably disposed on an inner circumferential side of the stator through an air gap and axially divided into two rotor portions, the rotor portions having different-polarity field magnets disposed alternately in a rotational direction; one of the rotor portions including a changing mechanism for changing a phase of synthesized magnetic poles of the field magnets relative to that of magnetic poles of the field magnets of the other rotor portion while truing up a magnetic pole center of the field magnets disposed in the one rotor portion and another magnetic pole center of the field magnets disposed in the other rotor portion in accordance with a direction of torque of the rotor, the one rotor portion being supported from axially opposite sides by a support mechanism.

A rotational electric machine comprising: a stator having windings; a rotor having field magnets, the field magnets being constituted by a first field magnet having different-polarity magnetic poles arranged successively in a rotational direction and a second field magnet being rotatable relative to the first field magnet and having different-polarity magnetic poles arranged successively in the rotational direction; the first and second field magnets being provided opposite to magnetic poles of the stator and having a mechanism for changing a phase of synthesized magnetic poles of the first and second field magnets relative to that of magnetic poles of the first field magnet in accordance with a direction of torque of the rotor; the mechanism for changing the phase in accordance with the direction of torque having means for truing up a magnetic pole center of the first field magnet and another magnetic pole center of the second field magnet on a basis of balance between the direction of torque generated in the rotor and magnetic action force between the first and second field magnets, and means for shifting the magnetic pole centers of the first and second field magnets whenever the direction of torque generated in the rotor is inverted; the second field magnet being supported from axially opposite sides by a support mechanism.

A vehicle comprising: an internal combustion engine for driving wheels; a battery for charging and discharging electric power; a rotational electric machine mechanically linked with a crank shaft of the internal combustion engine and driven by electric power supplied from the battery to thereby drive the internal combustion engine and driven by motive power from the internal combustion engine to thereby generate electric power to be supplied to the battery; an electric power converter for controlling the rotational electric machine; a control unit for controlling the electric power converter; the rotational electric machine being constituted by any one of the above-mentioned rotational electric machines.

A vehicle comprising: a battery for charging and discharging electric power; a rotational electric machine supplied with electric power from the battery to thereby drive wheels; an electric power converter for controlling the rotational electric machine; a control unit for controlling the electric power converter; the rotational electric machine being constituted by any one of the above-mentioned rotational electric machines.

A vehicle comprising: an internal combustion engine for driving front or rear wheels; a battery for charging and discharging electric power; a rotational electric machine driven by electric power supplied from the battery to thereby drive the front or rear wheels; an electric power converter for controlling the rotational electric machine; a control unit for controlling the electric power converter; the rotational electric machine being constituted by any one of the above-mentioned rotational electric machines.

A vehicle comprising: an internal combustion engine for driving wheels; a battery for charging and discharging electric power; a rotational electric machine mechanically linked with a crank shaft of the internal combustion engine and driven by electric power supplied from the battery to thereby drive the internal combustion engine; an electric power converter for controlling the rotational electric machine; a control unit for controlling the electric power converter; the rotational electric machine being constituted by any one of the above-mentioned rotational electric machines.

A vehicle comprising: an internal combustion engine for driving wheels; a battery for charging and discharging electric power; a rotational electric machine mechanically linked with a crank shaft of the internal combustion engine and driven by motive power from the internal combustion engine to thereby generate electric power to be supplied to the battery; an electric power converter for controlling the rotational electric machine; a control unit for controlling the electric power converter; the rotational electric machine being constituted by any one of the above-mentioned rotational electric machines.

DESCRIPTION OF THE EMBODIMENTS

Embodiment 1

Figure 1:
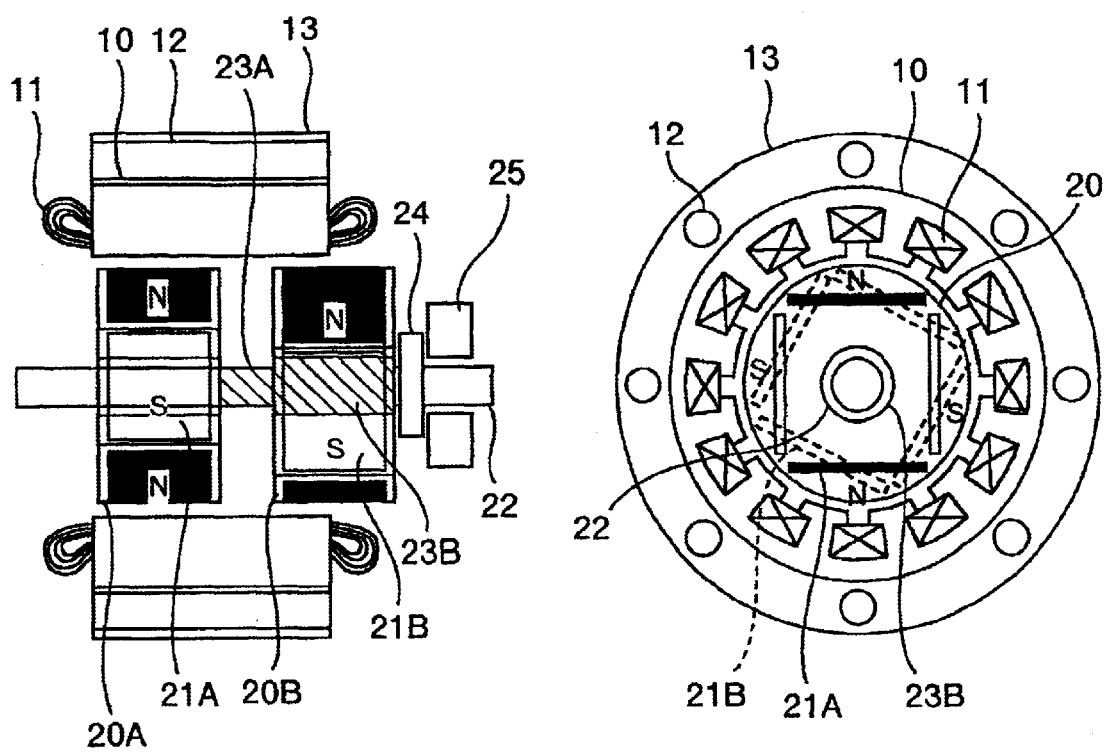
FIG. 1 is a sectional view showing the configuration of a permanent magnet type synchronous rotational electric machine.

A first embodiment of the present invention will be described below with reference to FIGS. 1 to 4, FIGS. 5A and 5B and FIGS. 6 to 8. FIG. 4 shows the configuration of arrangement of a hybrid car driving apparatus according to this embodiment. The driving apparatus according to this embodiment has an internal combustion engine 1 for generating vehicle driving force, a transmission 3, and a permanent magnet type synchronous rotational electric machine 2 mechanically connected between the engine 1 and the transmission 3. For connection of the engine 1 and the permanent magnet type synchronous rotational electric machine 2 to each other, there is employed a method of directly connecting an output shaft (not shown but also referred to as "crank shaft") of the engine 1 with a rotation shaft of the permanent magnet type synchronous rotational electric machine 2 to each other, or a method of connecting the engine 1 and the permanent magnet type synchronous rotational electric machine 2 through a transmission constituted by a planetary reduction gear mechanism or the like.

On the other hand, for connecting the transmission 3 and the permanent magnet type synchronous rotational electric machine 2 to each other, there is employed a method of connecting an input shaft of the transmission 3 not shown and the rotation shaft of the permanent magnet type synchronous rotational electric machine 2 to each other through a clutch serving as a motive power connecting/disconnecting means, or through a fluid coupling using fluid or through a torque converter. In this method, a clutch, a fluid coupling or a torque converter for connecting the transmission 3 and the permanent magnet type synchronous rotational electric machine 2 to each other is used so that the permanent magnet type synchronous rotational electric machine 2 starts the engine 1 and transmits driving force of the engine 1 or both driving force of the engine 1 and driving force of the permanent magnet type synchronous rotational electric machine 2 to the input shaft of the transmission 3 after the start of the engine 1.

The permanent magnet type synchronous rotational electric machine 2 can operate as an electric motor or as an electric power generator. A battery 5 serving as an electric power storage means is electrically connected to the permanent magnet type synchronous rotational electric machine 2 through an electric power converter 4.

When the permanent magnet type synchronous rotational electric machine 2 is used as an electric motor, DC electric power outputted from the battery 5 is converted into AC electric power by the electric power converter 4 (inverter) so that the AC electric power is supplied to the permanent magnet type synchronous rotational electric machine 2. In this manner, the permanent magnet type synchronous rotational electric machine 2 is driven. The driving force of the permanent magnet type synchronous rotational electric machine 2 is used for starting or assisting the engine 1. On the other hand, when the permanent magnet type synchronous rotational electric machine 2 is used as an electric power generator, AC electric power generated by the permanent magnet type synchronous rotational electric machine 2 is converted into DC electric power by the electric power converter 4 (converter) so that the DC electric power is supplied to the battery 5 to thereby be stored in the battery 5.

Figure 2:
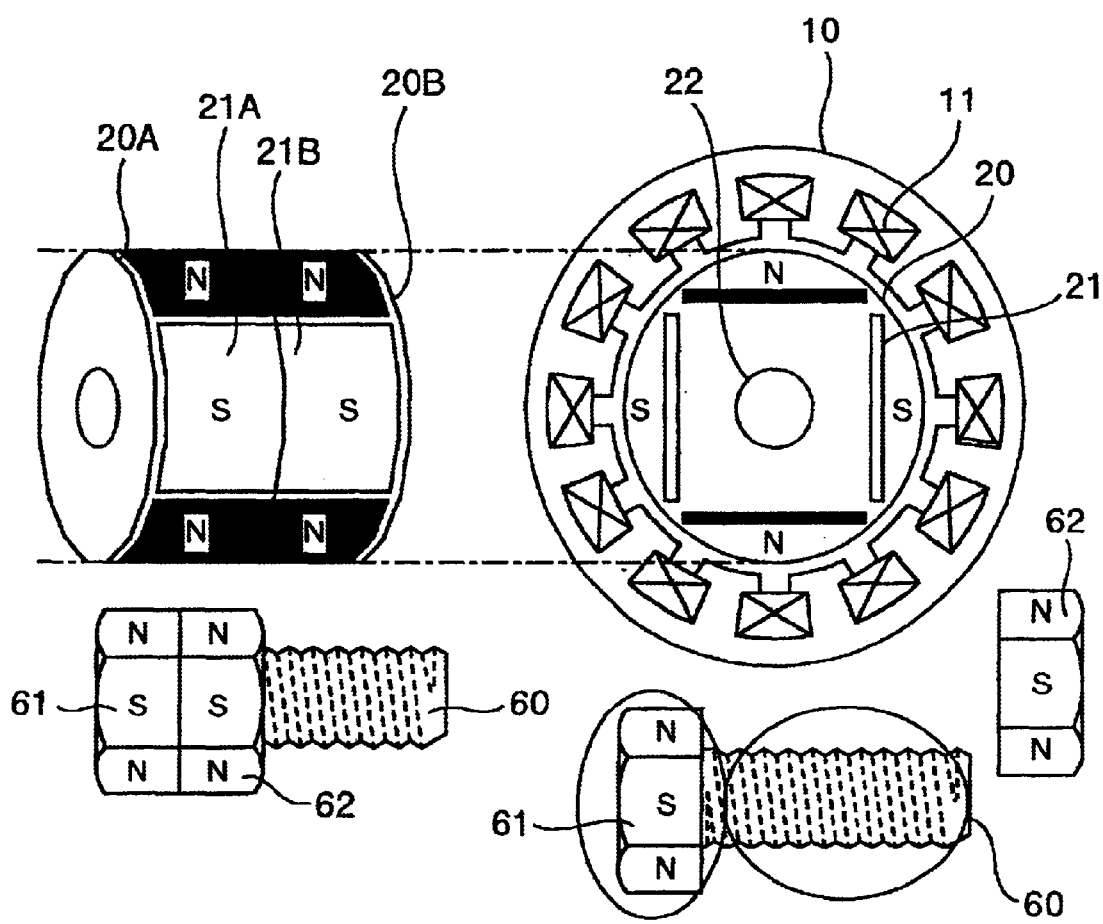
FIG. 2 is a view for explaining the operation of the permanent magnet type synchronous rotational electric machine depicted in FIG. 1 and showing a state in which the magnetic pole centers of rotor portions are aligned.
Figure 3:
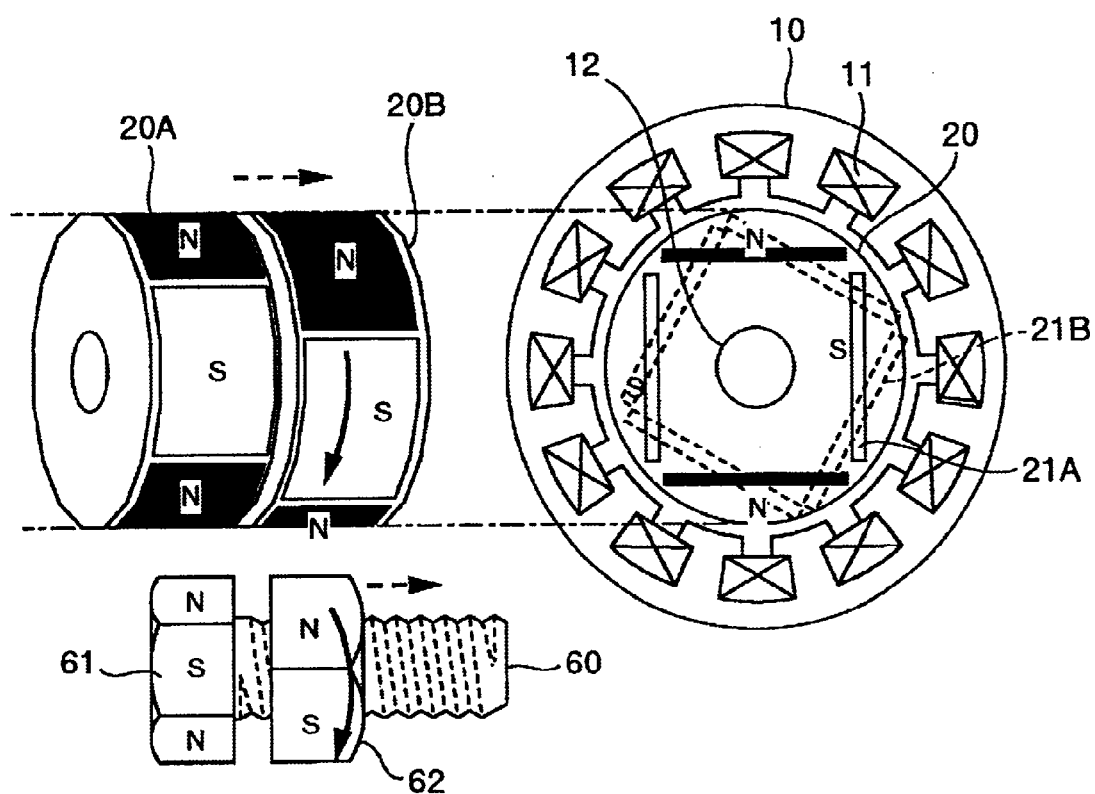
FIG. 3 is a view for explaining the operation of the permanent magnet type synchronous rotational electric machine depicted in FIG. 1 and showing a state in which the magnetic pole centers of rotor portions are different from each other.
Figure 4:
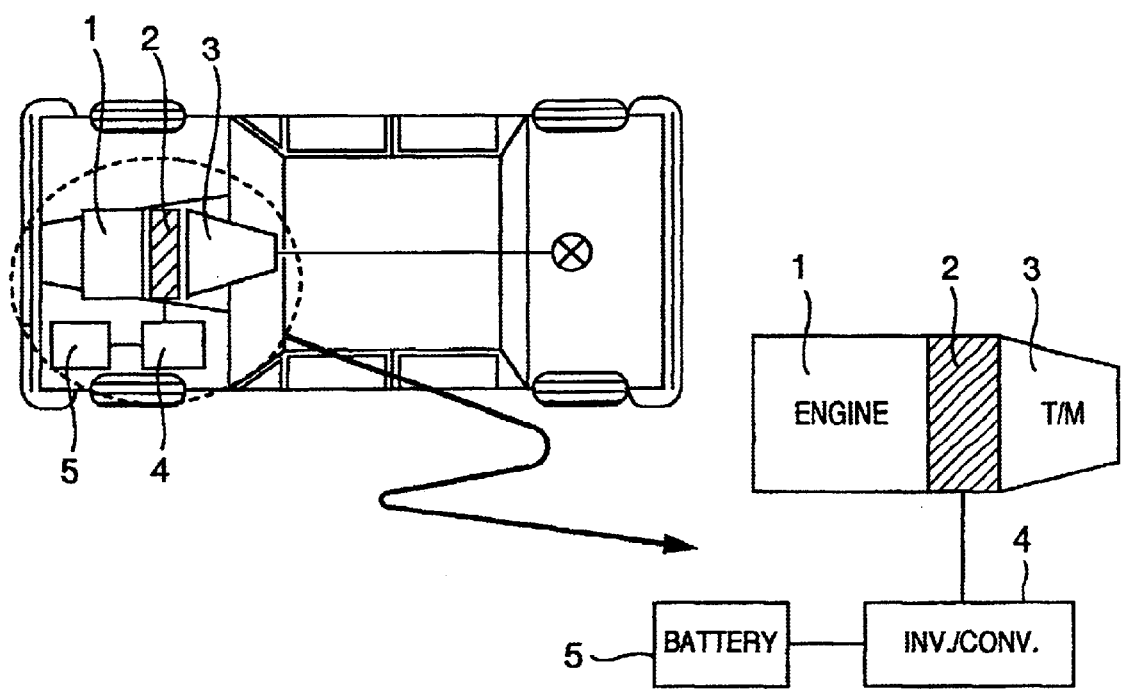
FIG. 4 is a plan view showing the configuration of arrangement of a hybrid car driving apparatus according to a first embodiment of the present invention and showing the apparatus of the type in which the permanent magnet type synchronous rotational electric machine is directly linked with an engine.

FIGS. 1 through 3 show the configuration of the permanent magnet type synchronous rotational electric machine 2.

In FIG. 1, the reference numeral 13 designates a housing 13 (also referred to as "stator frame"). A plurality of cooling water channels 12 provided axially continuously for making cooling water flow are formed circumferentially in the inside of the housing 13. A stator iron core 10 is fastened onto the inner circumferential side of the housing 13 by shrinkage fitting, press fitting, or the like. A plurality of slots (also referred to as "grooves") provided axially continuously and opened in an inner circumferential surface of the stator iron core 10 are formed circumferentially in an inner circumferential portion of the stator iron core 10. Armature windings 11 (also referred to as "stator windings" or "primary windings") are mounted in the slots of the stator iron core 10.

A rotor 20 is rotatably provided on the inner circumferential side of the stator iron core 10 with an air gap provided therebetween. The rotor 20 is divided into two rotor portions axially. That is, the rotor 20 includes a first rotor portion 20A fixed to a shaft 22 (also referred to as "rotation shaft"), and a second rotor portion 20B provided so as to be separable from the shaft 22 and movable axially while rotating around the shaft 22 when the second rotor portion 20B receives torque in a predetermined direction. A plurality of permanent magnets 21A are embedded in the first rotor portion 20A in such a manner that the polarity of the magnets is alternately changed in the direction of the rotation of the first rotor portion 20A. A plurality of permanent magnets 21B are embedded in the second rotor portion 20B in such a manner that the polarity of the magnets is alternately changed in the direction of the rotation of the second rotor portion 20B.

The first rotor portion 20A, the second rotor portion 20B and the shaft 22 are in a relation of a bolt and a nut. That is, the first rotor portion 20A corresponds to a head portion 61 of a bolt and the shaft 22 corresponds to a thread portion 60 of the bolt. The second rotor portion 20B corresponds to a nut 62. Therefore, the first rotor portion 20A is fixed to the shaft 22. The shaft 22 has external thread formed on its outer circumferential surface. The second rotor portion 22B has internal thread on its inner circumferential surface so that the internal thread can be thread-engaged with the external thread formed on the shaft 22. Hence, in a certain direction of rotation, the second rotor portion 20B moves to one side axially while rotating around the shaft 22, so that the second rotor portion 20B is separated from the first rotor portion 20A. When the direction of rotation is reversed, the second rotor portion 20B moves to the other side axially while rotating around the shaft 22, so that the first rotor portion 20A and the second rotor portion 20B are united into one rotor.

A ring-like stopper 24 serving as a movement prevention member is provided on one side of the shaft 22 (on the second rotor portion 20B side opposite to the first rotor portion 20A side) so that the second rotor portion 20B is prevented from coming off from an axial end of the stator iron core 10 by a displacement not exceeding a predetermined quantity. An actuator 25 serving as a mechanism for driving the stopper 24 and also as a servo mechanism is provided on a side portion of the stopper 24. The stopper 24 is driven by the actuator 25 so that the stopper 24 can move around the shaft 22 in opposite axial directions. According to this embodiment, the axial position of the second rotor portion 20B relative to the first rotor portion 20A can be changed suitably by a rotor position changing means constituted by a combination of the stopper 24 and the actuator 25. Hence, the quantity of effective magnetic flux determined by the permanent magnets 21A and the permanent magnets 21B can be controlled into an arbitrary quantity in accordance with the direction of torque.

The operation of the permanent magnet type synchronous rotational electric machine 2 in this embodiment will be described below. In a rotational electric machine having a rotor provided with permanent magnets for magnetic field, the direction of torque received by the rotor in the case where the rotational electric machine operates as an electric motor is reversed to that in the case where the rotational electric machine operates as an electric power generator when the direction of rotation of the rotor in the former case is the same as that in the latter case. Further, when the direction of rotation of the rotor is reversed, the direction of torque is also reversed. This embodiment basically makes use of the above principle. The rotational electric machine is operated as an electric motor when the rotational electric machine is in a low rotational speed region, for example, at the time of the start of the engine 1 or the like and the rotational electric machine is operated as an electric power generator when the rotational electric machine is in a high rotational speed region. The two operations are as follows.

In a low rotational speed region of the rotational electric machine, for example, at the time of the start of the engine 1 or the like, the first and second rotor portions 20A and 20B are brought close to each other, as shown in FIG. 2, with balance between the direction of torque generated in the rotor 20 and the magnetic action force between the permanent magnets 21A and 21B. Thus, the first and second rotor portions 20A and 20B are united into one rotor. The permanent magnets 21A and 21B with the same polarity are arranged axially so that the centers of the magnetic poles of the permanent magnets 21A and 21B are trued up. That is, the nut 62 is tightened to bring the head portion 61 of the bolt and the nut 62 close to each other. Hence, the quantity of effective magnetic flux generated by the permanent magnets is maximized. As a result, high torque characteristic can be obtained.

In a high rotational speed region of the rotational electric machine, the direction of rotation is the same as in the case of the electric motor but the direction of torque received by the rotor is reversed to the case of the electric motor. Therefore, as shown in FIG. 3, the second rotor portion 20B is moved axially to one side (opposite to the first rotor portion 20A side) while rotated around the shaft 22 on the basis of the direction of torque which is generated in the rotor 20 so as to be reverse to that in the case where the rotational electric machine is operated as an electric motor. Thus, the second rotor portion 20B is separated from the first rotor portion 20A so that the second rotor portion 20B is displaced from the center of the magnetic poles of the permanent magnets 21A and 21B. That is, the nut 62 is loosened, so that the nut 62 is separated from the head portion 61 of the bolt. Hence, the quantity of effective magnetic flux generated by the permanent magnets is reduced. In other words, a field weakening effect is obtained. As a result, high output electric power generating characteristic can be obtained.

Figure 5A:
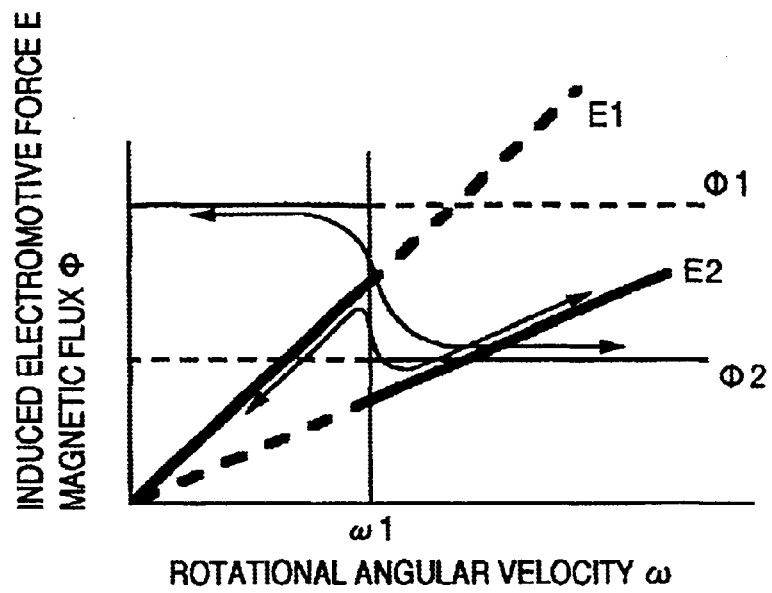
FIGS. 5A and 5B are characteristic graphs showing the relation of induced electromotive force E and magnetic flux Φ with rotational angular velocity ω of the permanent magnet type synchronous rotational electric machine depicted in FIG. 1.
Figure 5B:
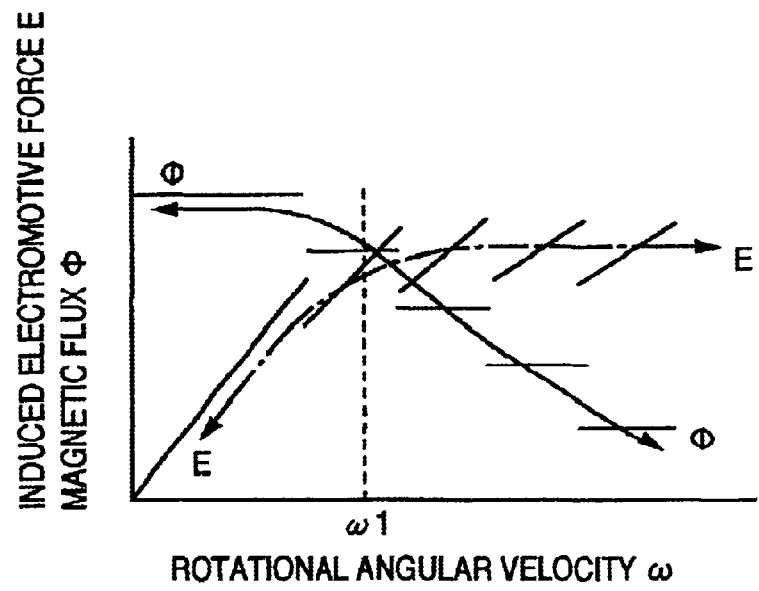

The operation of the rotational electric machine in accordance with the rotational speed region will be described below with reference to FIGS. 5A and 5B. FIGS. 5A and 5B show characteristics of effective magnetic flux $\Phi$ and induced electromotive force E with respect to the rotational angular velocity $\omega$ of the permanent magnet type synchronous rotational electric machine 2. The induced electromotive force E of the permanent magnet type synchronous rotational electric machine 2 is determined on the basis of the effective magnetic flux $\Phi$ which is generated by the permanent magnets 21A and 21B placed in the rotor 20 and the rotational angular velocity $\omega$. Hence, as shown in FIG.

5A, when, for example, the rotational angular velocity ω (rotational speed) is increased while the effective magnetic flux Φ1 generated by the permanent magnets 21A and 21B placed in the rotor 20 is kept constant, the induced electromotive force E1 increases in proportion to the rotational angular velocity ω.

However, when the permanent magnet type synchronous rotational electric machine 2 is operated as an electric motor or as an electric power generator while the effective magnetic flux is kept one and the same in all rotational speed regions of the permanent magnet type synchronous rotational electric machine 2, for example, when the permanent magnet type synchronous rotational electric machine 2 is operated as an electric power generator with effective magnetic flux Φ1 in a high rotational speed region of the engine 1, the induced electromotive force E1 of the permanent magnet type synchronous rotational electric machine 2 rises to a value not lower than the charging voltage of the battery 5. Therefore, to prevent the battery 5 storing the electric power from being broken, the induced electromotive force of the permanent magnet type synchronous rotational electric machine 2 needs to be controlled to be not higher than the charging voltage of the battery 5. Hence, when the permanent magnet type synchronous rotational electric machine 2 is used as an electric power generator, it is necessary to carry out control for reducing the magnetic flux generated by the permanent magnets 21A and 21B, that is, so-called field weakening control in a region of a certain rotational speed or higher.

Therefore, in this embodiment, the induced electromotive force E1 is generated while the effective magnetic flux generated by the permanent magnets 21A and 21B is kept Φ1 in a low rotational speed region side with respect to the rotational angular velocity ω1 taken as a boundary, as shown in FIG. 5A. In a high rotational speed region side with respect to the rotational angular velocity ω1, the effective magnetic flux generated by the permanent magnets 21A and 21B is switched to Φ2, thereby generating induced electromotive force E2 lower than the induced electromotive force E1. In this manner, the maximum value of the induced electromotive force of the permanent magnet type synchronous rotational electric machine 2 can be limited, so that the battery 1 can be charged at a voltage equal to or lower than the rated charging voltage of the battery 5 even in the case where the permanent magnet type synchronous rotational electric machine 2 is used as an electric power generator in a high rotational speed region of the engine 1. Hence, in this embodiment, the battery 5 can be prevented from being broken.

Incidentally, in a conventional rotational electric machine, a current for field weakening control is made to flow in stator windings to thereby perform field weakening control. It is, however, necessary to increase the current for field weakening control in accordance with the induced electromotive force which increases in proportion to the rotational angular velocity. Hence, heat generated in the stator windings rises. Accordingly, in the conventional rotational electric machine, there is the possibility that reduction in efficiency of the rotational electric machine, demagnetization of permanent magnets owing to heat generated beyond the cooling performance or the like may occur in a high rotational speed region. In this respect, in the permanent magnet type synchronous rotational electric machine 2 in this embodiment, field weakening control is performed by mechanical control, that is, by control of effective magnetic flux by dividing the rotor into two rotor portions. Hence, the above problem never occurs. Further, according to this embodiment, the induced electromotive force in a high rotational speed region is suppressed by mechanical field weakening control to thereby prevent the efficiency of the permanent magnet type synchronous rotational electric machine 2 from being lowered, so that the permanent magnet type synchronous rotational electric machine 2 can be used as an assist with good efficiency in a high rotational speed region.

Moreover, in this embodiment, as shown in FIG. 5B, the effective magnetic flux Φ is changed more delicately in accordance with the rotational angular velocity ω, that is, the stopper 24 is moved gradually to a side opposite to the second rotor portion 20B side by the actuator 25 so that the second rotor portion 20B is separated from the first rotor portion 20A gradually. As a result, the induced electromotive force E generated in the permanent magnet type synchronous rotational electric machine 2 can be kept approximately constant in the high rotational speed region with respect to the rotational angular velocity ω1.

Figure 6:
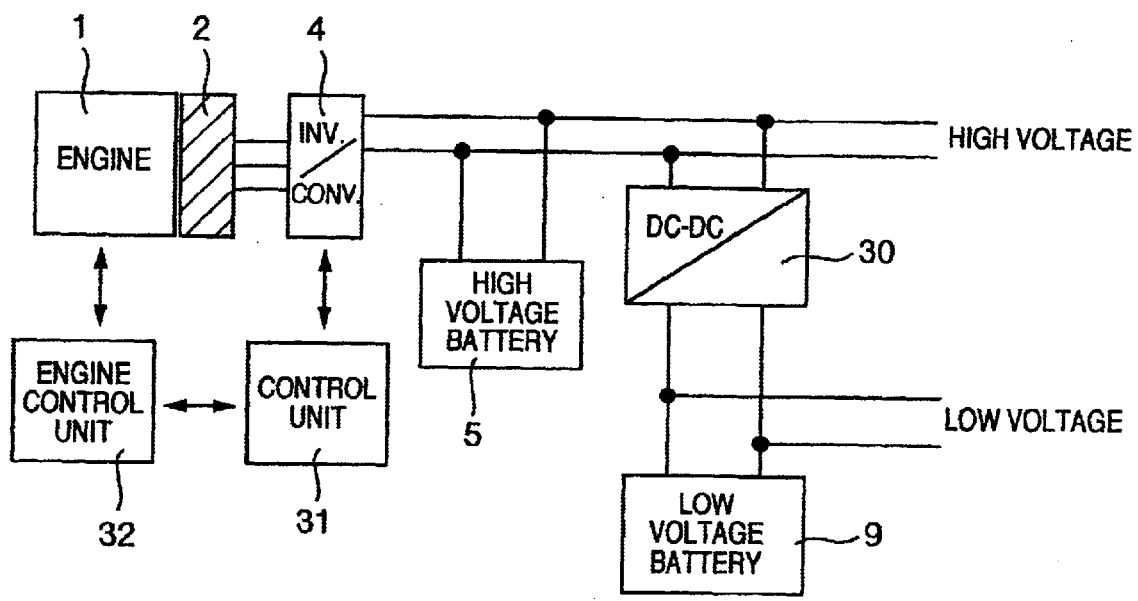
FIG. 6 is a system diagram showing the configuration of a power supply system in the permanent magnet type synchronous rotational electric machine depicted in FIG. 1.

FIG. 6 is a diagram showing a power supply system of the permanent magnet type synchronous rotational electric machine 2. A three-phase AC terminal of the permanent magnet type synchronous rotational electric machine 2 mechanically connected to the engine 1 is electrically connected to the electric power converter 4 (inverter and converter). A DC side terminal of the electric power converter 4 is electrically connected to the battery 5 (for high voltage) and to a high voltage system. A low voltage system and a battery 9 (for low voltage) having headlights, audio equipment or the like as load apparatuses are electrically connected to the high voltage system through a DC—DC converter 30. Accordingly, electric power lowered in voltage by the DC—DC converter 30 is supplied to the low voltage system and the battery 9 from the high voltage system.

The vehicle is equipped with a control unit 31 for controlling driving of the permanent magnet type synchronous rotational electric machine 2, and with an engine control unit 32 for controlling the throttle opening degree, the quantity of fuel injection, or the like, of the engine 1. The control unit 31 and the engine control unit 32 are configured in such a manner that information transmission or direct memory access can be made by communication means such as a communication line, a communications network (e.g., in-vehicle LAN (local area network)) or a radio communication system. When information communication is performed between the control unit 31 and the engine control unit 32 as described above, cooperative control of the permanent magnet type synchronous rotational electric machine 2 and the engine 1 can be performed.

Figure 7:
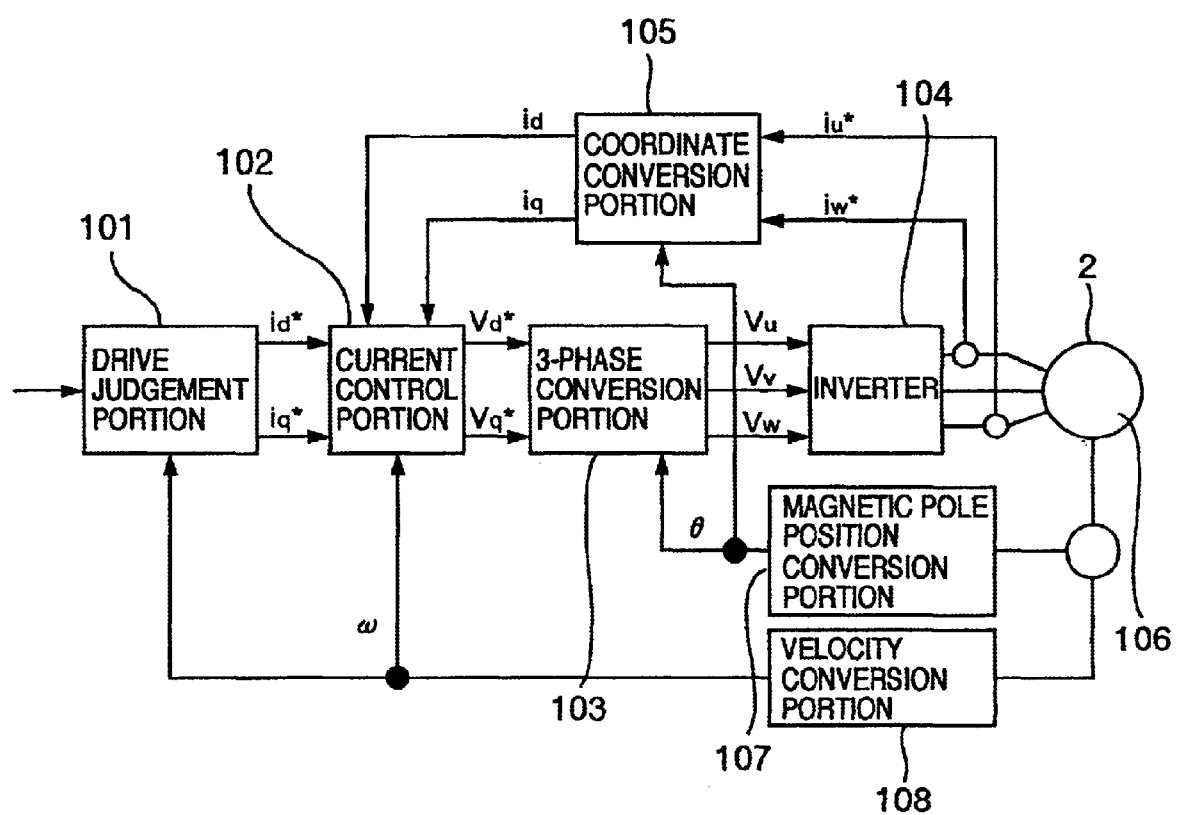
FIG. 7 is a block diagram showing the configuration of a control unit in the permanent magnet type synchronous rotational electric machine depicted in FIG. 1.

FIG. 7 shows the configuration of the control unit 31. The control unit 31 performs operation mode switching of the permanent magnet type synchronous rotational electric machine 2, that is, switching between a drive mode (electric motor) and a power generation mode (electric power generator), and generates an instruction value to control driving of the permanent magnet type synchronous rotational electric machine 2 in accordance with the operating condition of the vehicle. Driving control of the permanent magnet type synchronous rotational electric machine 2 is performed by controlling the electric power converter 4 (inverter 104) on the basis of the instruction value outputted from the control unit 31. Operation mode switching of the permanent magnet type synchronous rotational electric machine 2 is performed by controlling the actuator 25 to drive the stopper 24 in accordance with the operating condition of the vehicle.

Status signals such as the battery residual quantity, the operation mode of the vehicle, the throttle opening degree, etc., as information from various kinds of sensors attached to the engine control unit 32 and on board equipment are inputted to the control unit 31. Further, the rotational speed and the positions of magnetic poles of the permanent magnet type synchronous rotational electric machine 2, and the two-phase content of the three-phase AC current supplied to the permanent magnet type synchronous rotational electric machine 2 are fed back to the control unit 31.

Signals outputted from various kinds of sensors attached to the engine control unit 32 and on board equipment and the angular velocity ω outputted from a velocity conversion portion 108 are inputted to a drive judgment portion 101. The drive judgment portion 101 judges the running operation of the permanent magnet type synchronous rotational electric machine 2 on the basis of these signals and outputs current instruction values $i_D{}^*$ and $i_Q{}^*$ in a rotating coordinate system (d-q axis). Here, the rotating coordinate system represents coordinates having d axis extending in a direction of the position of the magnetic pole (magnetic flux) of the rotational electric machine and q axis extending in a direction electrically perpendicular to the d axis. Hence, $i_D{}^*$ is a d-axis current instruction value and $i_Q{}^*$ is a q-axis current instruction value. Incidentally, the velocity conversion portion 108 outputs the value of angular velocity ω based on the rotational speed of the permanent magnet type synchronous rotational electric machine 2 detected by a detector 106. The rotational speed of the permanent magnet type synchronous rotational electric machine 2 may be replaced by the rotational speed of the engine or by a multiplied value of the rotational speed of the engine if a speed change gear is provided.

The angular velocity ω outputted from the velocity conversion portion 108, the current instruction values $i_D{}^*$ and $i_Q{}^*$ outputted from the drive judgment portion 101 and current values $i_D$ and $i_Q$ outputted from a coordinate conversion portion 105 are inputted to a current control portion 102. The current control portion 102 outputs voltage instruction values $v_D{}^*$ and $v_Q{}^*$ based on the angular velocity ω and differences between the current instruction values $i_D{}^*$, $i_Q{}^*$ and the current values $i_D{}^*$, $i_Q{}^*$. Incidentally, the coordinate conversion portion 105 outputs the current values $i_D$ and $i_Q$ based on u-phase current $i_U{}^*$ and w-phase current $i_W{}^*$ among the three-phase AC current outputted from the inverter 104 and based on the position of the magnetic pole outputted from a magnetic pole position conversion portion 107. The magnetic pole position conversion portion 107 outputs the position of the magnetic pole based on the position of the magnetic pole of the permanent magnet type synchronous rotational electric machine 2 detected by the detector 106.

The magnetic pole position outputted from the magnetic pole position conversion portion 107 and the voltage instruction values $v_D{}^*$ and $v_Q{}^*$ outputted from the current control portion 102 are inputted to a three-phase conversion portion 103. The three-phase conversion portion 103 outputs a u-phase voltage instruction value $v_U$, a v-phase voltage instruction value $v_V$ and a w-phase voltage instruction value $v_W$ based on these inputted signals. The u-phase voltage instruction value $v_U$, the v-phase voltage instruction value $v_V$ and the w-phase voltage instruction value $v_W$ are inputted to the inverter 104 to control the current supplied from the inverter 104 to the permanent magnet type synchronous rotational electric machine 2. Hence, the driving of the permanent magnet type synchronous rotational electric machine 2 is controlled.

Embodiment 2

A second embodiment of the present invention will be described below with reference to FIGS. 8 through 10.

Figure 8:
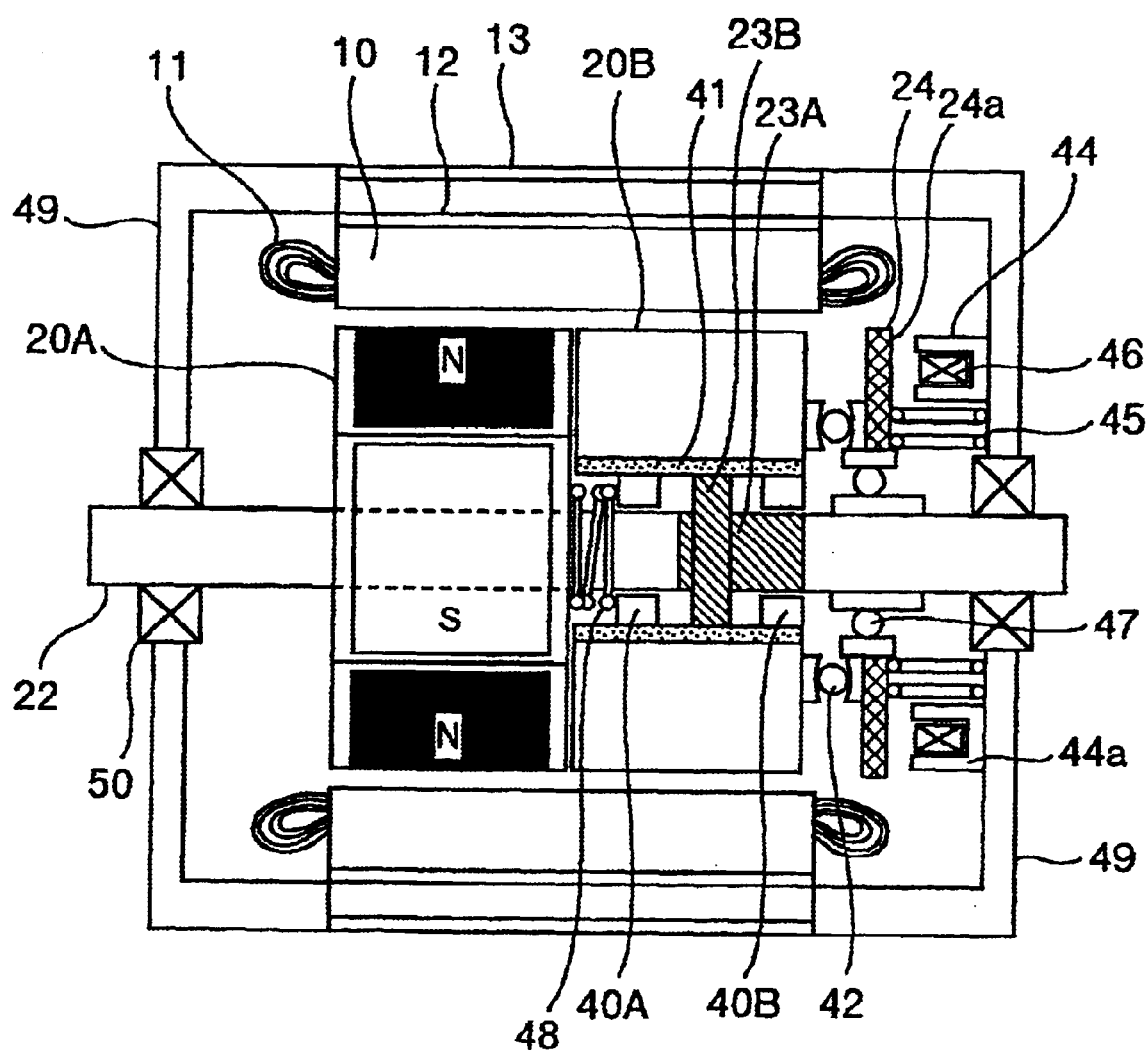
FIG. 8 is a sectional view showing the configuration of the permanent magnet type synchronous rotational electric machine according to a second embodiment of the present invention and showing a state in which a coil of an electromagnetic clutch is not excited.
Figure 9:
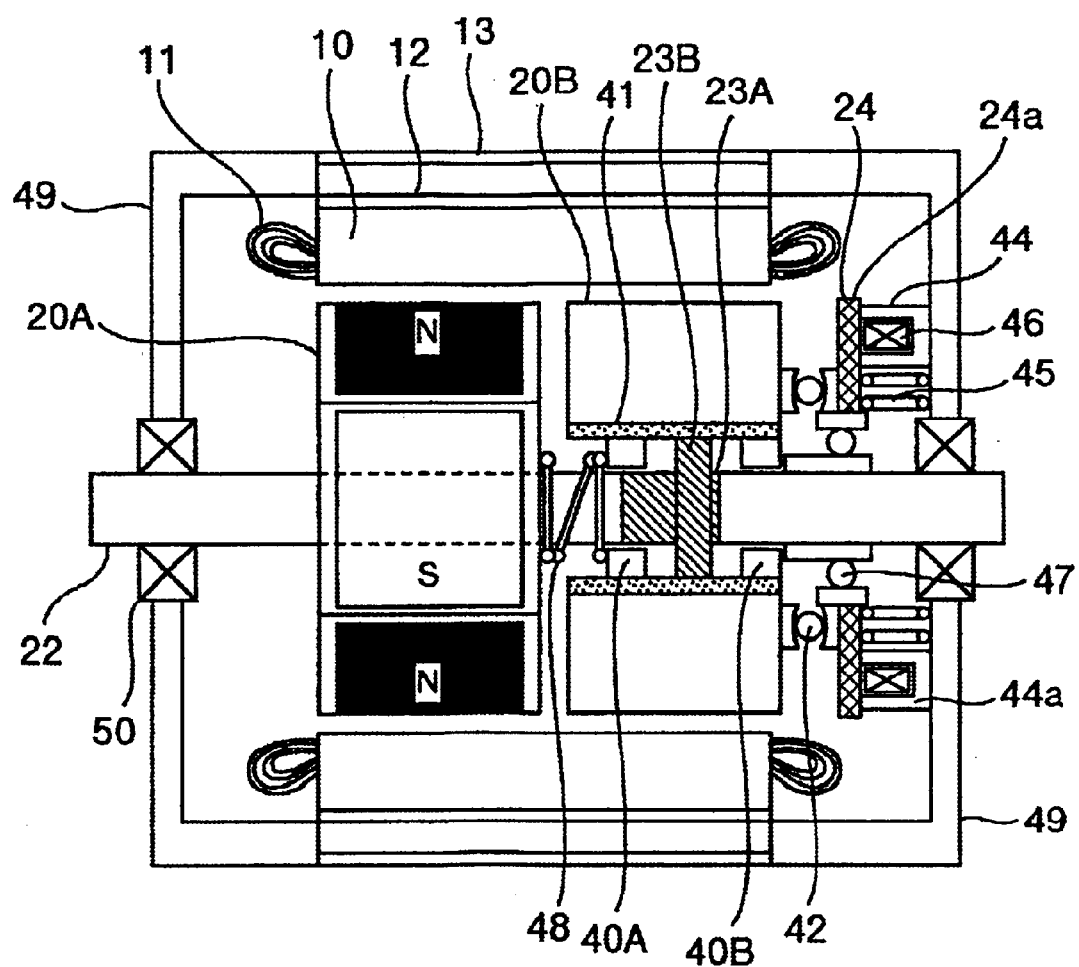
FIG. 9 is a sectional view showing the configuration of the permanent magnet type synchronous rotational electric machine according to the second embodiment of the present invention and showing a state in which the coil of the electromagnetic clutch is excited.
Figure 10:
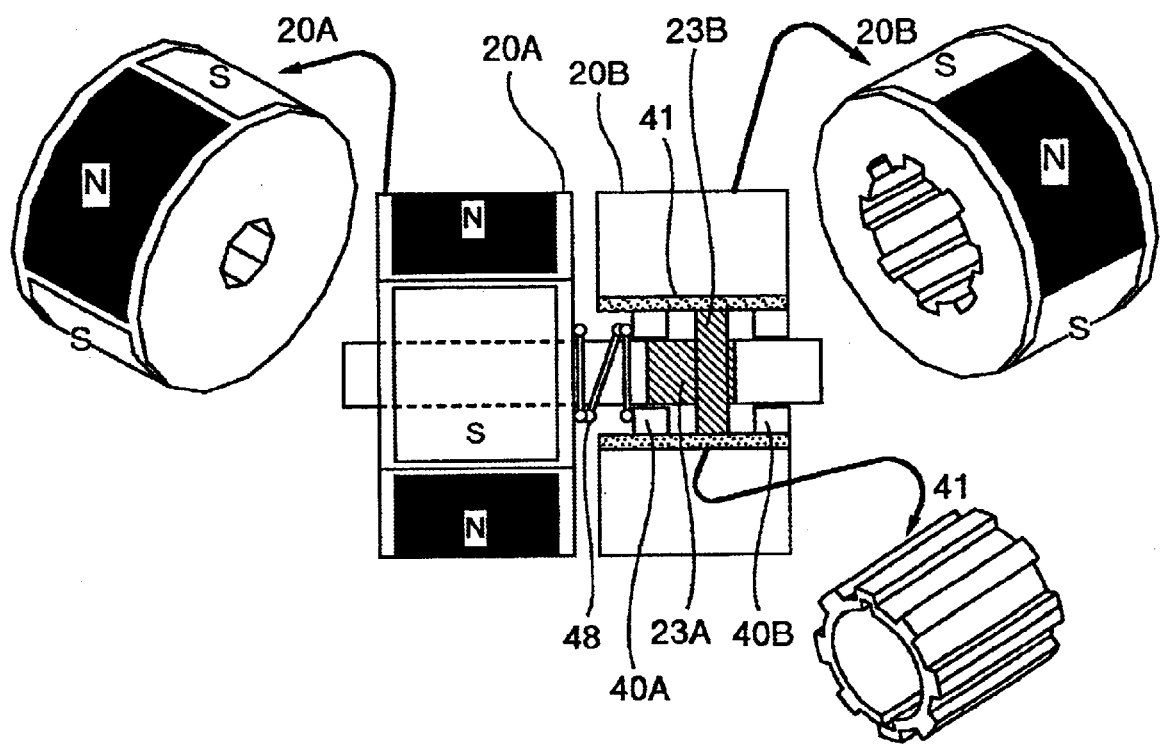
FIG. 10 is a detailed view showing the detailed configuration of rotor portions in the permanent magnet type synchronous rotational electric machine according to the second embodiment of the present invention.

FIGS. 8 through 10 show the configuration of a permanent magnet type synchronous rotational electric machine according to this embodiment. This embodiment is an improved example of the above-described first embodiment. Like the first embodiment, a plurality of cooling water channels 12 provided axially continuously for making cooling water flow are formed circumferentially. A stator iron core 10 having armature windings 11 mounted in slots respectively is fastened to the inner circumferential side of a housing 13. Ring-like end brackets 49 which are frame members are provided on opposite end portions of the housing 13. Bearing apparatuses 50 for rotatably supporting the shaft 22 are provided on the inner circumferential sides of the end brackets 49 respectively.

Like the first embodiment, the rotor 20 rotatably arranged on the inner circumferential side of the stator iron core 10 is axially divided into two rotor portions. That is, the rotor 20 has a first rotor portion 20A fixed to the shaft 22, and a second rotor portion 20B which is provided so as to be separable from the shaft 22 and which can move axially while rotating around the shaft 22 upon reception of torque in a predetermined direction. Similarly to FIG. 1, a plurality of permanent magnets 21A are embedded in the first rotor portion 20A in such a manner that the polarity of magnets is changed alternately in the direction of rotation of the first rotor portion 20A. A plurality of permanent magnets 21B are embedded in the second rotor portion 20B in such a manner that the polarity of magnets is changed alternately in the direction of rotation of the second rotor portion 20B. Incidentally, the second rotor portion 20B is formed so that the inner diameter of the second rotor portion 20B is larger than the outer diameter of the shaft 22.

A plurality of axially continuous irregularities are formed circumferentially in the inner circumferential surface of the second rotor portion 20B. A sleeve 41 having a shape corresponding to the shape of the inner circumferential surface of the second rotor portion 20B, that is, having a plurality of axially continuous irregularities formed circumferentially on its outer circumferential surface are fitted into the inner circumferential side of the second rotor portion 20B. A nut member 23B having external thread formed on its inner circumferential surface is fixed to the inner circumferential side of the sleeve 41. The nut member 23B is thread-engaged with a thread portion 23A (external thread) formed on the outer circumferential surface of the shaft 22, that is, the thread portion 23A and the nut member 23B are in a relation of a bolt and a nut. Ring-like support members 40A and 40B are fixed to opposite sides of the nut member 23B on the inner circumferential side of the sleeve 41 with a predetermined gap therebetween. The support members 40A and 40B guide the rotating motion and axially reciprocating motion of the second rotor portion 20B. A spring 48 which is an elastic body is provided between the support member 40A and the first rotor portion 20A. The spring 48 generates force for pressing the second rotor portion 20B toward a side opposite to the first rotor portion 20A side.

The reason why the sleeve 41 is provided on the inner circumferential side of the second rotor portion 20B is to prevent electric corrosion from occurring in the shaft 22, the nut member 23B, or the like. That is, when there is some slight play between the inner circumferential side of the second rotor portion 20B and the shaft 22, a change of flux linkage occurs between the inner circumferential side of the second rotor portion 20B and the shaft 22 with the advance of rotation. This change causes a failure such as electric corrosion or the like. Therefore, in this embodiment, the sleeve 41 is provided on the inner circumferential side of the second rotor portion 20B to thereby magnetically shield the inner circumferential side of the second rotor portion 20B and the shaft 22 from each other. Accordingly, the sleeve 41 is made out of a non-magnetic material having an electrical resistivity higher than that of iron. Further, the sleeve 41 also has an electrically insulating effect.

The stopper 24 capable of moving axially is provided on a side of the second rotor portion 20B (opposite to the first rotor portion 20A side). An electromagnetic clutch 44 which is a servo mechanism for driving the stopper 24 is provided on a side of the stopper 24 (opposite to the second rotor portion 20B side).

The stopper 24 has a ring-like movable iron core 24a constituting the electromagnetic clutch 44, a support member 47 provided between the inner circumferential side of the movable iron core 24a and the outer circumferential side of the shaft 22, and a support member 42 provided between a side surface of the movable iron core 24a (on the second rotor portion 20B side) and a side surface of the second rotor portion 20B (on the movable iron core 24a side). The support member 47 is constituted by a radial bearing capable of supporting the movable iron core 24a on the shaft 22 rotating and allows the movable iron core 24a to move axially. The support member 42 is constituted by a thrust bearing capable of supporting the movable iron core 24a on the side surface of the second rotor portion 20B rotating and allows the movable iron core 24a to be mechanically connected to the second rotor portion 20B.

The electromagnetic clutch 44 has the movable iron core 24a serving also as a member of the stopper 24, a ring-like yoke 44 provided on a side surface of the end bracket 49 on the second rotor portion 20B side, a coil 46 inserted into a ring-like groove of the yoke 44, and a spring 45 provided inward the yoke 44 and between the side surface of the end bracket 49 on the second rotor portion 20B side and the movable iron core 24a. The yoke 44 and the coil 46 form an electromagnetic force generating portion. When a current flows in the coil 46 to thereby excite the coil 46, sucking electromagnetic force is generated. The movable iron core 24a can be moved to a side opposite to the second rotor portion 20B side by the sucking electromagnetic force. The spring 45 which is an elastic body generates force to press the movable iron core 24a toward the second rotor portion 20B side. In such a manner, the movable iron core 24a can move toward the second rotor portion 20B side. At this time, excitation of the coil 46 is cut off. Although this embodiment has shown the case where the electromagnetic clutch 44 is attached to the end bracket 49, the present invention may be applied also to the case where the electromagnetic clutch 44 is attached, for example, to a part of a vehicle body of the vehicle on which the permanent magnet type synchronous rotational electric machine is mounted so that the end bracket 49 can be omitted.

Similarly to the first embodiment, also the permanent magnet type synchronous rotational electric machine configured as described above according to this embodiment is operated as an electric motor in a low rotational speed region of the rotational electric machine and as an electric power generator in a high rotational speed region of the rotational electric machine.

In a low rotational speed region of the rotational electric machine, the first rotor portion 20A and the second rotor portion 20B are brought close to each other by balance between the direction of torque generated in the rotor 20 and magnetic action force between the permanent magnets 21A and 21B so that the rotor portions 20A and 20B are united into one rotor. If the permanent magnets 21A and 21B having the same polarity are arranged axially, the centers of the magnetic poles of the permanent magnets 21A and 21B are trued up. Hence, the quantity of effective magnetic flux generated by the permanent magnets is maximized. As a result, high torque characteristic can be obtained. FIG. 8 shows this state.

Because the coil 46 is in a non-excited state at this time, the movable iron core 24a is attracted by the second rotor portion 20B while the movable iron core 24a is pushed toward the second rotor portion 20B side by the function of the spring 45. Hence, the movable iron core 24a moves with the second rotor portion 20B, so that the axial position of the second rotor portion 20B can be kept relative to the first rotor portion 20A. Further, because the second rotor portion 20B is pushed toward the movable iron core 24a side by a constant force owing to the function of the spring 48, the force of moving the second rotor portion 20B toward the first rotor portion 20A side can be suppressed to prevent equipment from being broken, etc., due to collision of the second rotor portion 20B with the first rotor portion 20A, etc. Furthermore, because the second rotor portion 20B is pushed toward the movable iron core 24a side by a constant force owing to the function of the spring 48, the function of the support member 42 as a thrust bearing can be improved. Incidentally, the force for moving the second rotor portion 20B toward the first rotor portion 20A side may be suppressed by controlling the excitation of the coil 46. Further, the axially moving force of the second rotor portion 20B may be balanced by controlling the excitation of the coil 46 so that the axial position of the second rotor portion 20B relative to the first rotor portion 20A can be changed suitably.

In a high rotational speed region of the rotational electric machine, the direction of rotation is the same as in the aforementioned case of an electric motor but the direction of torque received by the rotor is reversed to that in the case of an electric motor. Therefore, the second rotor portion 20B is axially moved toward a side opposite to the first rotor portion 20A side while rotated around the shaft 22 in accordance with the direction of torque which is generated in the rotor 20 and which is reverse to that in the case where the rotational electric machine is operated as an electric motor. Hence, the second rotor portion 20B is separated from the first rotor portion 20A and the centers of the magnetic poles of the permanent magnets 21A and 21B are shifted from each other. Hence, the quantity of effective magnetic flux generated by the permanent magnets is reduced. In other words, a field weakening effect is obtained. As a result, high output electric power generating characteristic can be obtained.

Because the coil 46 is in an excited state at this time, the movable iron core 24a is sucked toward a side opposite to the second rotor portion 20B side by electromagnetic force generated in the electromagnetic force generating portion. At the same time, the movable iron core 24a is pushed by the second rotor portion 20B, so that the movable iron core 24a moves with the second rotor portion 20B. Hence, the axial position of the second rotor portion 20B relative to the first rotor portion 20A can be kept. Further, because the second rotor portion 20B is pushed toward the first rotor portion 20A side by a constant force owing to the function of the spring 45 and control of the excitation of the coil 46, the force of moving the second rotor portion 20B toward a side opposite to the first rotor portion 20A side can be suppressed. Hence, the thread of the nut member 23B and the thread portion 23A of the shaft 22 can be prevented from being broken due to overmovement of the second rotor portion 20B toward a side opposite to the first rotor portion 20A side. Furthermore, because the second rotor portion 20B is pressed toward the movable iron core 24a side by a constant force owing to the function of the spring 48, the function of the support member 42 as a thrust bearing can be improved. Incidentally, the axially moving force of the second rotor portion 20B may be balanced by controlling the excitation of the coil 46 so that the axial position of the second rotor portion 20B relative to the first rotor portion 20A can be changed suitably.

Although the second embodiment has shown the case where the electromagnetic clutch 44 is used for driving the stopper 24, the present invention may be applied also to the case where a linear driving apparatus, a linear motor or the like constituted by a combination of a hydraulic actuator, a rotational machine, a ball screw, etc., is used so that the axial position of the stopper 24 can be controlled more delicately.

Embodiment 3

Figure 11:
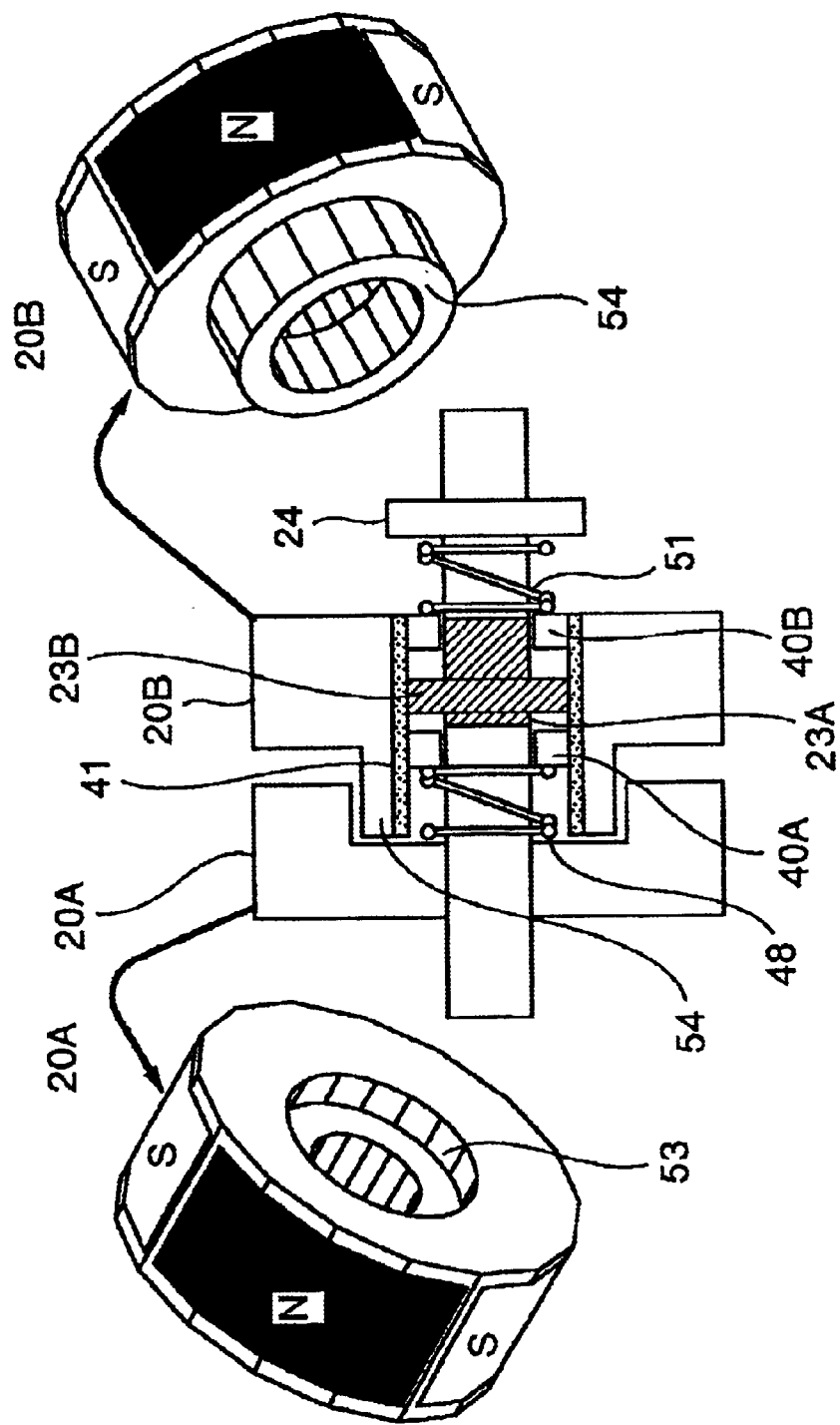
FIG. 11 is a detailed view showing the detailed configuration of rotor portions in the permanent magnet type synchronous rotational electric machine according to a third embodiment of the present invention.

A third embodiment of the present invention will be described below with reference to FIG. 11. FIG. 11 shows the configuration of a rotor of a permanent magnet type synchronous rotational electric machine according to this embodiment. This embodiment is an improved example of the above-described second embodiment. Only points of difference from the above embodiment will be explained below.

In this embodiment, a concave portion 53 having an inner diameter larger than the outer diameter of the shaft 22 is provided on the inner circumferential portion of a side surface of the first rotor portion 20A (on the second rotor portion 20B side surface). A protrusive portion 54 (convex portion) having an inner diameter which is smaller than the inner diameter of the concave portion 53, which is larger than the outer diameter of the shaft 22 and which is equal to the inner diameter of the second rotor portion 20B is provided on a side surface of the second rotor portion 20B opposite to the concave portion 53 of the first rotor portion 20A. Such a configuration is effective in the case where the axial thickness of the second rotor portion 20B is small.

The sleeve 41 is fitted into the inner circumferential side of the second rotor portion 20B and the inner circumferential side of the protrusive portion 54. The sleeve 41 has the same configuration as in the previous embodiment. The sleeve 41 may be integrated with the protrusive portion 54 or with the second rotor portion 20B. The nut member 23B and the support members 40A and 40B are fixed to the inner circumferential side of the sleeve 41, similarly to the previous embodiment.

The spring 48 of an elastic body is provided between the first rotor portion 20A and the support member 40A. The spring 48 generates force to push the second rotor portion 20B toward a side opposite to the first rotor portion 20A side. A spring 51 of an elastic body is provided between the support member 40B and the stopper 24. The spring 51 generates force to push the second rotor portion 20B toward the first rotor portion 20A side. According to this embodiment, the function of the springs 48 and 51 can suppress the moving force of the second rotor portion 20B while the function of the springs 48 and 51 can assist the axial movement of the second rotor portion 20B and keep the axial position of the second rotor portion 20B relative to the first rotor portion 20A.

Embodiment 4

Figure 12:
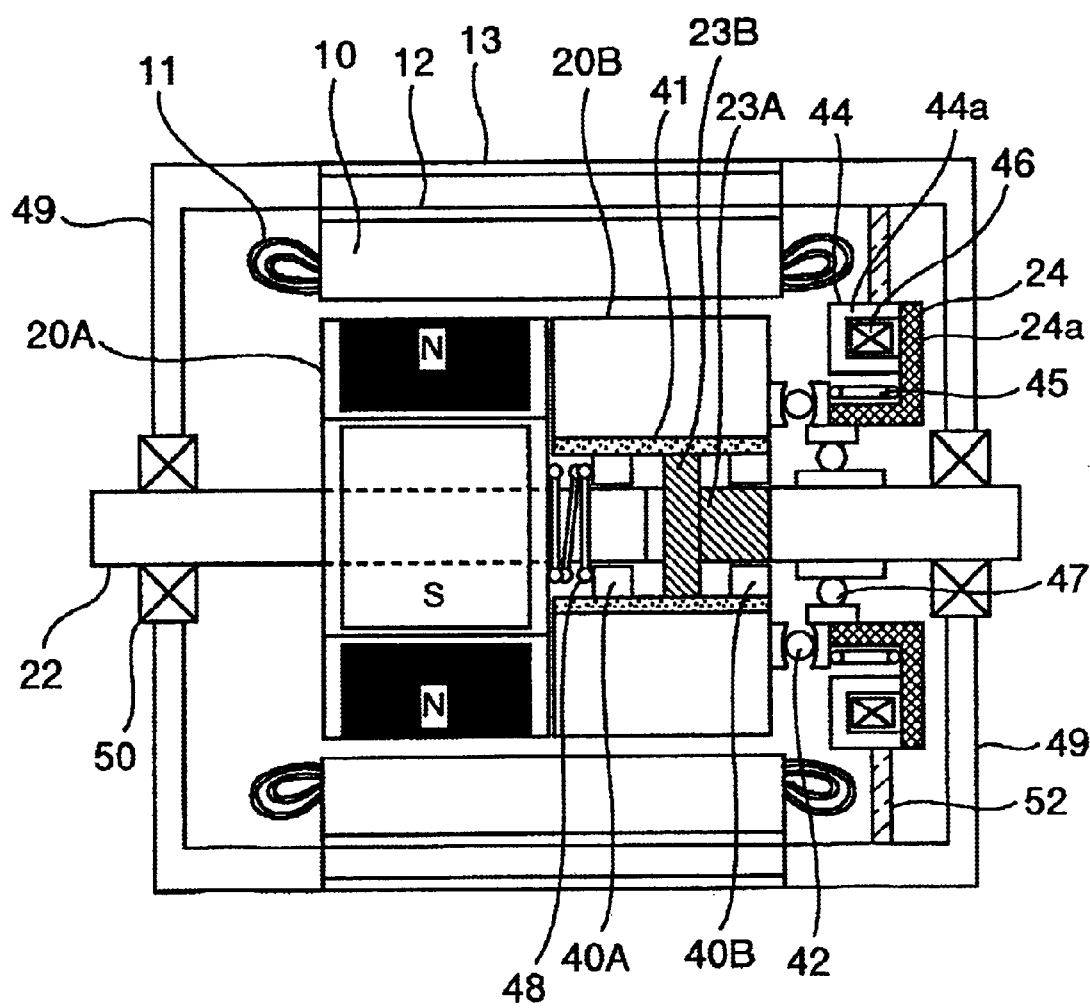
FIG. 12 is a sectional view showing the configuration of the permanent magnet type synchronous rotational electric machine according to a fourth embodiment of the present invention.

A fourth embodiment of the present invention will be described below with reference to FIG. 12. FIG. 12 shows the configuration of a permanent magnet type synchronous rotational electric machine according to this embodiment. This embodiment is a modified example of the second embodiment and different from the second embodiment in the configuration of the rotor position changing means constituted by a combination of the electromagnetic clutch 44 and the stopper 24. Incidentally, FIG. 12 shows a state in which the coil 46 is excited.

In this embodiment, the movable iron core 24a serving also as a member of the stopper 24 is shaped like an L figure in section. A yoke 44a of the electromagnetic clutch 44 is provided on the second rotor portion 20B side of the movable iron core 24a. The yoke 44a is supported by the end bracket 49 via an arm 52 attached to the outer circumferential side of the yoke 44a. The spring 45 is provided between the support member 42 constituting a thrust bearing and the movable iron core 24a. The spring 45 generates force to push the movable iron core 24a toward a side opposite to the second rotor portion 20B side. Although this embodiment has shown the case where the electromagnetic clutch 44 is attached to the end bracket 49, the present invention may be applied also to the case where the electromagnetic clutch 44 is attached, for example, to a part of a vehicle body of the vehicle equipped with the permanent magnet type synchronous rotational electric machine so that the end bracket 49 can be omitted.

According to this embodiment, when the permanent magnet type synchronous rotational electric machine is operated as an electric motor in a low rotational speed region of the rotational electric machine, the coil 46 is excited to generate suction force. The movable iron core 24a is moved toward the second rotor portion 20B side by the suction force and tensile force given by the second rotor portion 20B. When the permanent magnet type synchronous rotational electric machine is operated as an electric power generator in a high rotational speed region of the rotational electric machine, the excitation of the coil 46 is cut off and the movable iron core 24a is moved toward a side opposite to the second rotor portion 20B side by the function of the spring 45 and pressing force given by the second rotor portion 20B. That is, the rotor position changing means according to this embodiment can achieve the same effect as that in the second embodiment but the function thereof is reverse to that in the second embodiment.

Incidentally, although this embodiment has shown the case where the electromagnetic clutch 44 is used for driving the stopper 24, the present invention may be applied also to the case where a linear driving apparatus, a linear motor or the like constituted by a combination of a hydraulic actuator, a rotational machine, a ball screw, etc., is used so that the axial position of the stopper 24 can be controlled more delicately.

Embodiment 5

Figure 13:
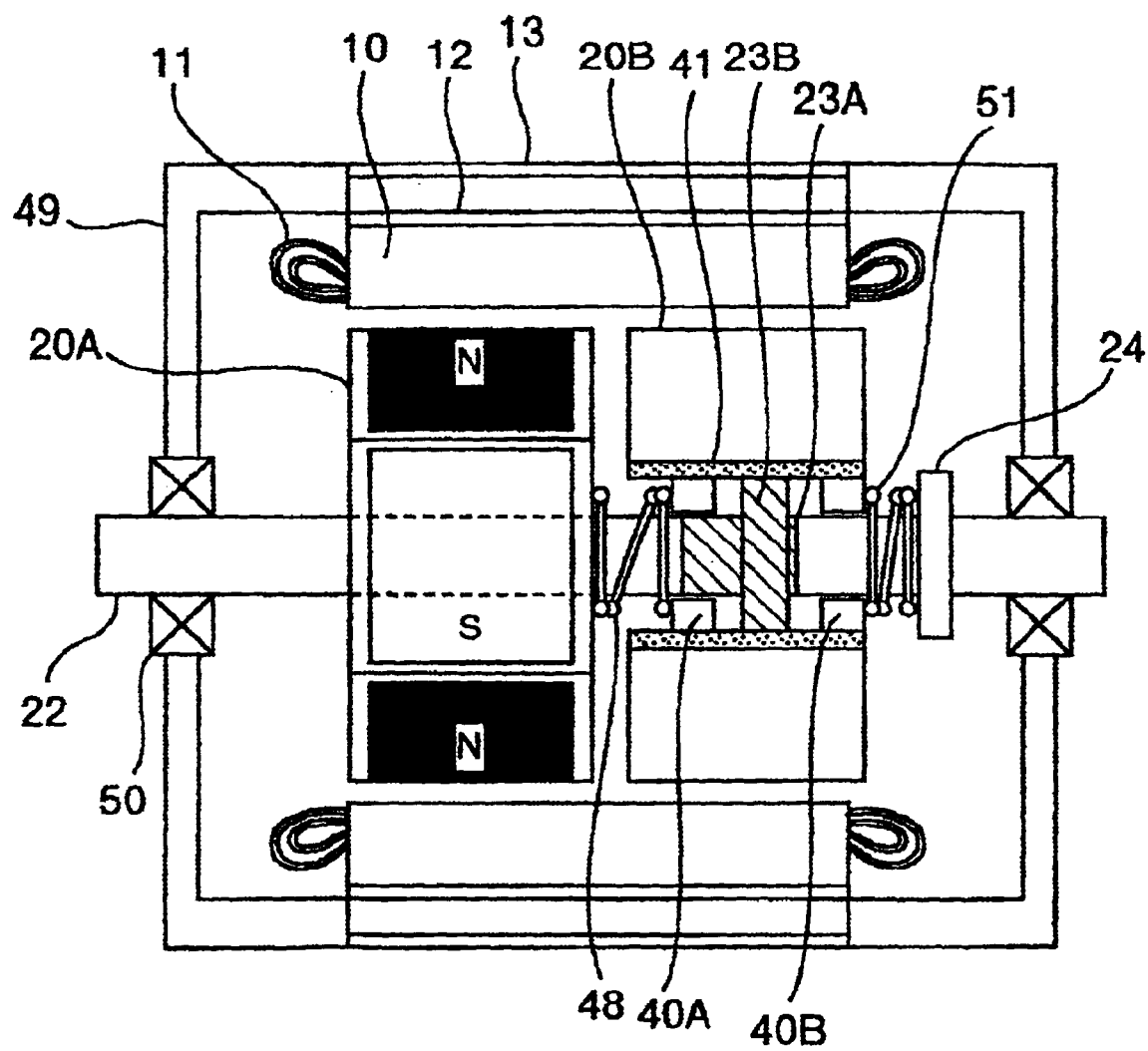
FIG. 13 is a sectional view showing the configuration of the permanent magnet type synchronous rotational electric machine according to a fifth embodiment of the present invention.

A fifth embodiment of the present invention will be described below with reference to FIG. 13. FIG. 13 shows the configuration of a permanent magnet type synchronous rotational electric machine according to this embodiment. This embodiment is a modified example of the third embodiment and shows the case where the concave portion is not provided in the first rotor portion 20A and the protrusive portion is not provided in the second rotor portion 20B. Also in this embodiment, the function of the springs 48 and 51 can suppress the moving force of the second rotor portion 20B while the function of the springs 48 and 51 can assist the axial movement of the second rotor portion 20B and keep the axial position of the second rotor portion 20B relative to the first rotor portion 20A.

Embodiment 6

Figure 14:
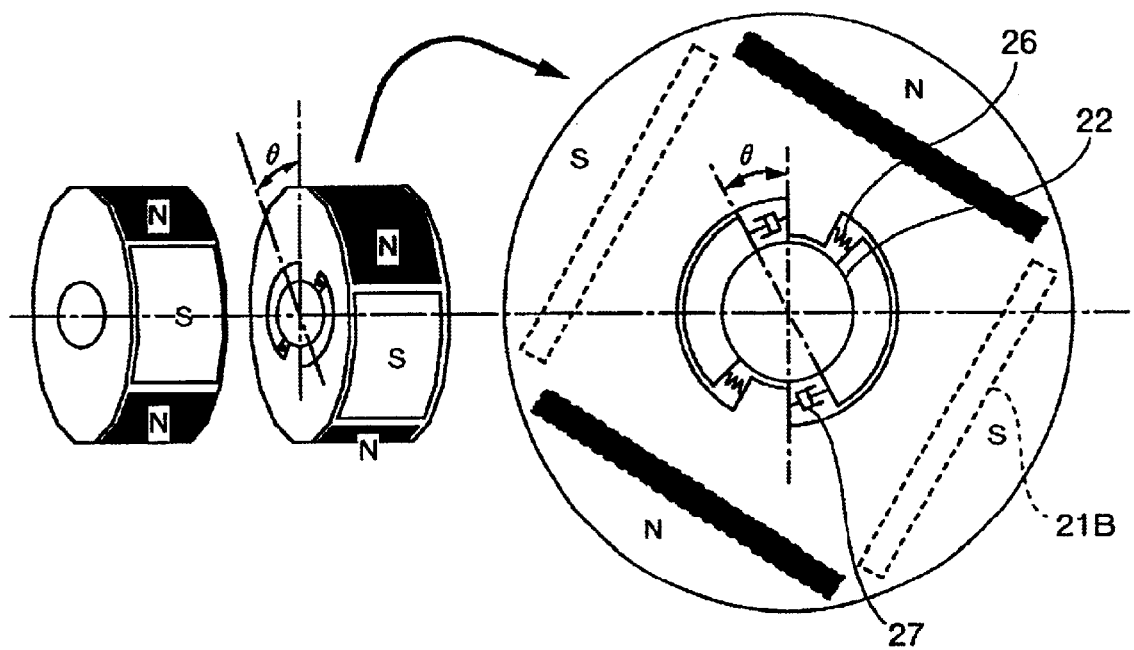
FIG. 14 is a detailed view showing the detailed configuration of rotor portions in the permanent magnet type synchronous rotational electric machine according to a sixth embodiment of the present invention.

A sixth embodiment of the present invention will be described below with reference to FIG. 14. FIG. 14 shows the configuration of a rotor of a permanent magnet type synchronous rotational electric machine according to this embodiment. This embodiment is a modified example of the first embodiment and shows the case where the mechanism constituted by a combination of the thread portion 23B formed in the second rotor portion 20B and the thread portion 23A formed in the shaft 22 is replaced by a mechanism which is capable of changing the rotation angle by $\theta$ and which is provided in the second rotor portion 20B.

Therefore, axially continuous convex portions are provided in two opposite places on the inner circumferential side of the second rotor portion 20B. Axially continuous concave portions are formed in portions of the outer circumfererntial side of the shaft 22 opposite to the convex portions of the second rotor portion 20B. The circumferential width of the concave portions of the shaft 22 is set to be larger than the circumferential width of the convex portions of the second rotor portion 20B. In this manner, the second rotor portion 20B can be rotated by a predetermined rotation angle $\theta$ relative to the first rotor portion 20A, and moved around the shaft 22 and thereby moves axially. Springs 26 and dampers 27 are provided between the circumferentially opposite sides of the convex portions of the second rotor portion 20B and the concave portions of the shaft 22. The provision of the springs 26 and the dampers 27 can relax sudden collision between the convex portions of the second rotor portion 20B and the concave portions of the shaft 22.

Embodiment 7

Figure 15:
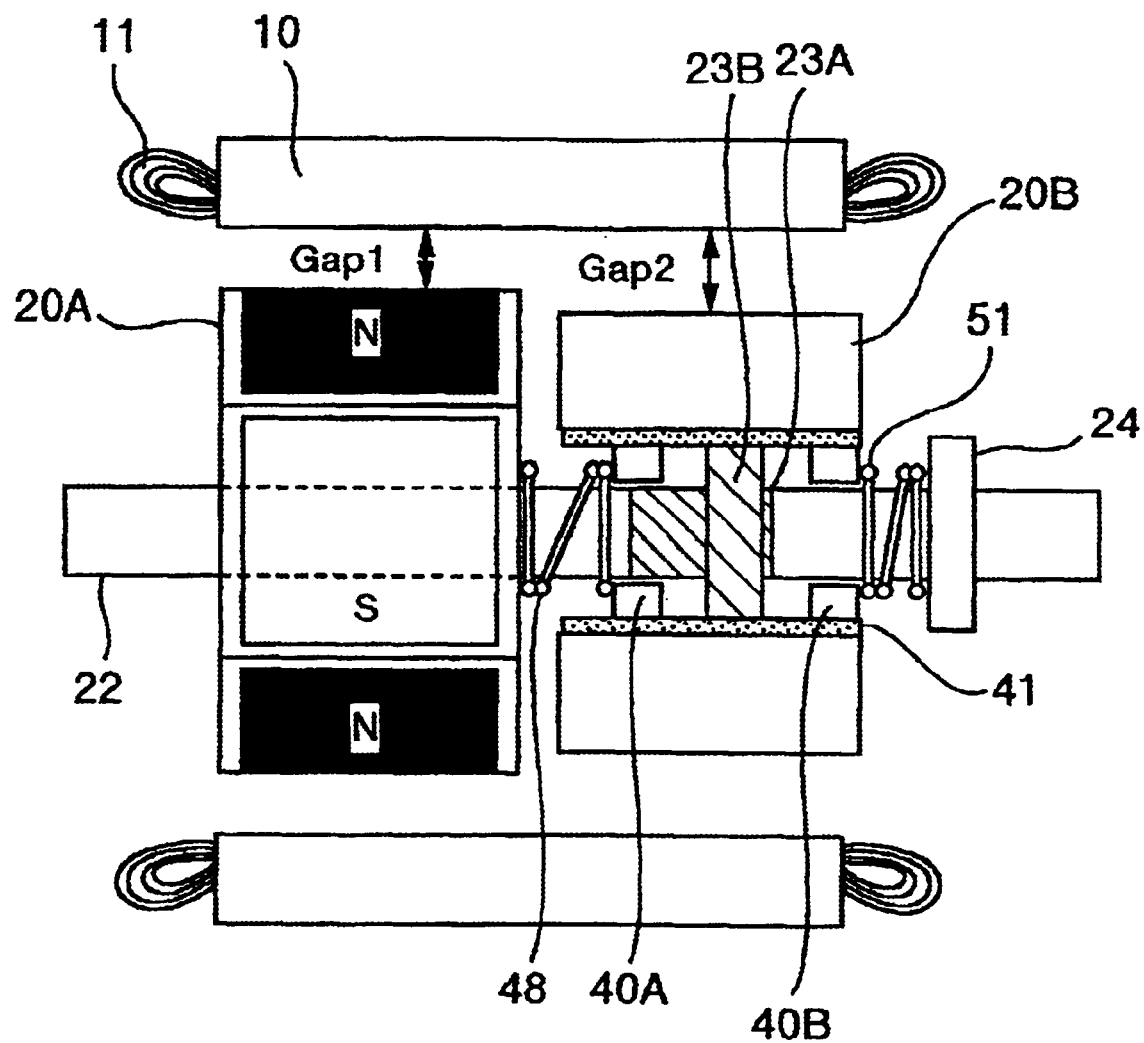
FIG. 15 is a sectional view showing the configuration of the permanent-magnet type synchronous rotational electric machine according to a seventh embodiment of the present invention.

A seventh embodiment of the present invention will be described below with reference to FIG. 15. FIG. 15 shows the configuration of a permanent magnet type synchronous rotational electric machine according to this embodiment. This embodiment is a modified example of the fifth embodiment and shows the case where the size of the air gap Gap1 between the stator iron core 10 and the first rotor portion 20A and the size of the air gap Gap2 between the stator iron core 10 and the second rotor portion 20B are made different from each other.

The first rotor portion 20A is fixed to the shaft 22 whereas the second rotor portion 20B is formed so as to be separable from the shaft 22. Hence, there is a slight mechanical play in size between the second rotor portion 20B and the shaft 22. When large torque, centrifugal force or the like is applied to the second rotor portion 20B, there is the possibility that the second rotor portion 20B may become eccentric. Therefore, in this embodiment, Gap2 is set to be larger than Gap1, thereby preventing the rotational electric machine from being broken mechanically owing to contact between the second rotor portion 20B and the stator iron core 10.

Embodiment 8

Figure 16:
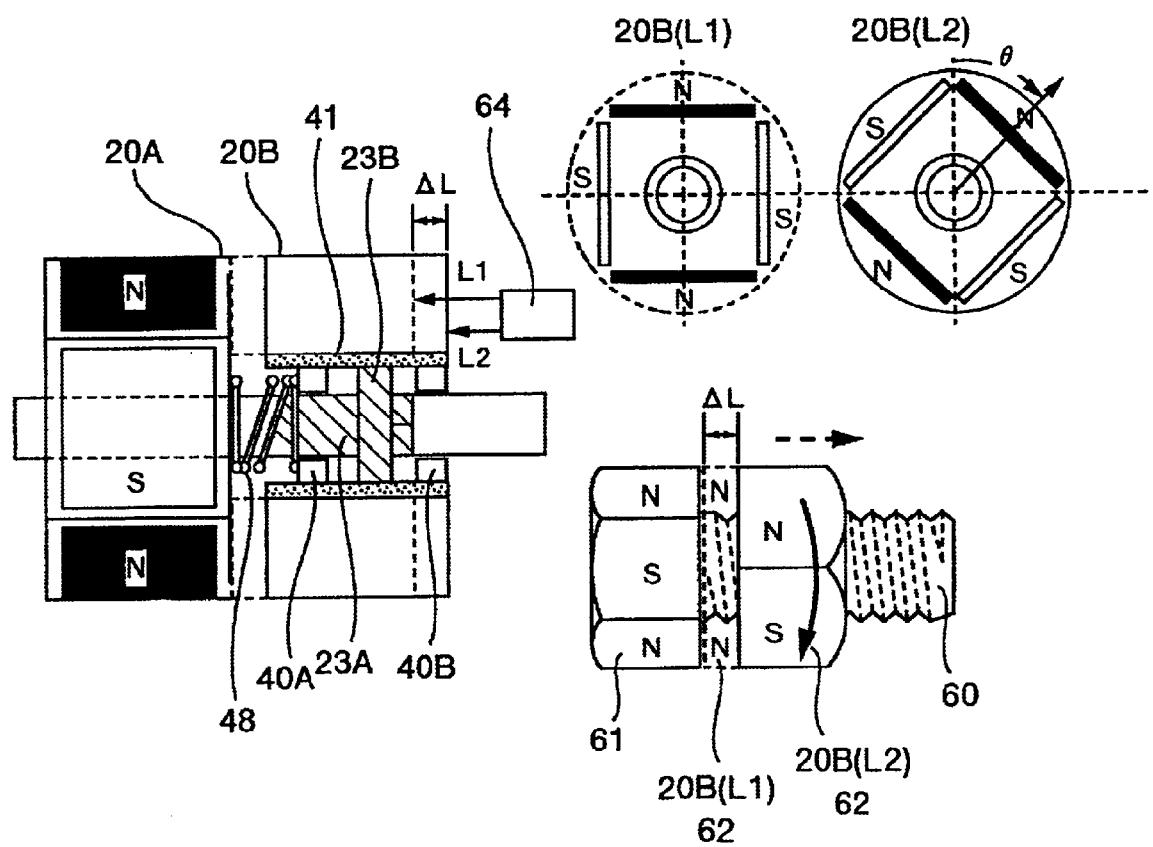
FIG. 16 is a sectional view showing the configuration of the permanent-magnet type synchronous rotational electric machine according to an eighth embodiment of the present invention.

An eighth embodiment of the present invention will be described below with reference to FIG. 16. FIG. 16 shows the configuration of a permanent magnet type synchronous rotational electric machine according to this embodiment. This embodiment is a modified example of the fifth embodiment and shows the case where axial displacements L1 and L2 of the second rotor portion 20B relative to the first rotor portion 20A are detected by a displacement measuring unit 64 so that the detected displacements L1 and L2 are fed back to a control unit for controlling the driving of the permanent magnet type synchronous rotating machine. That is, when the second rotor portion 20B is displaced from the first rotor portion 20A by a rotation angle $\theta$, it is necessary to correct the leading angle of the current supplied to the permanent magnet type synchronous rotational electric machine on the basis of the displacement. The rotation angle $\theta$ of the second rotor portion 20B and the axial displacement $\Delta L$ thereof are proportional to each other.

Therefore, in this embodiment, the axial displacements L1 and L2 of the second rotor portion 20B relative to the first rotor portion 20A are fed back to the control unit to obtain a displacement difference $\Delta L$. The leading angle of the current supplied to the permanent magnet type synchronous rotational electric machine from the electric power converter is corrected on the basis of the obtained displacement difference $\Delta L$. According to this embodiment, the permanent magnet type synchronous rotational electric machine can be controlled optimally by correcting the leading angle of the current.

Embodiment 9

Figure 17:
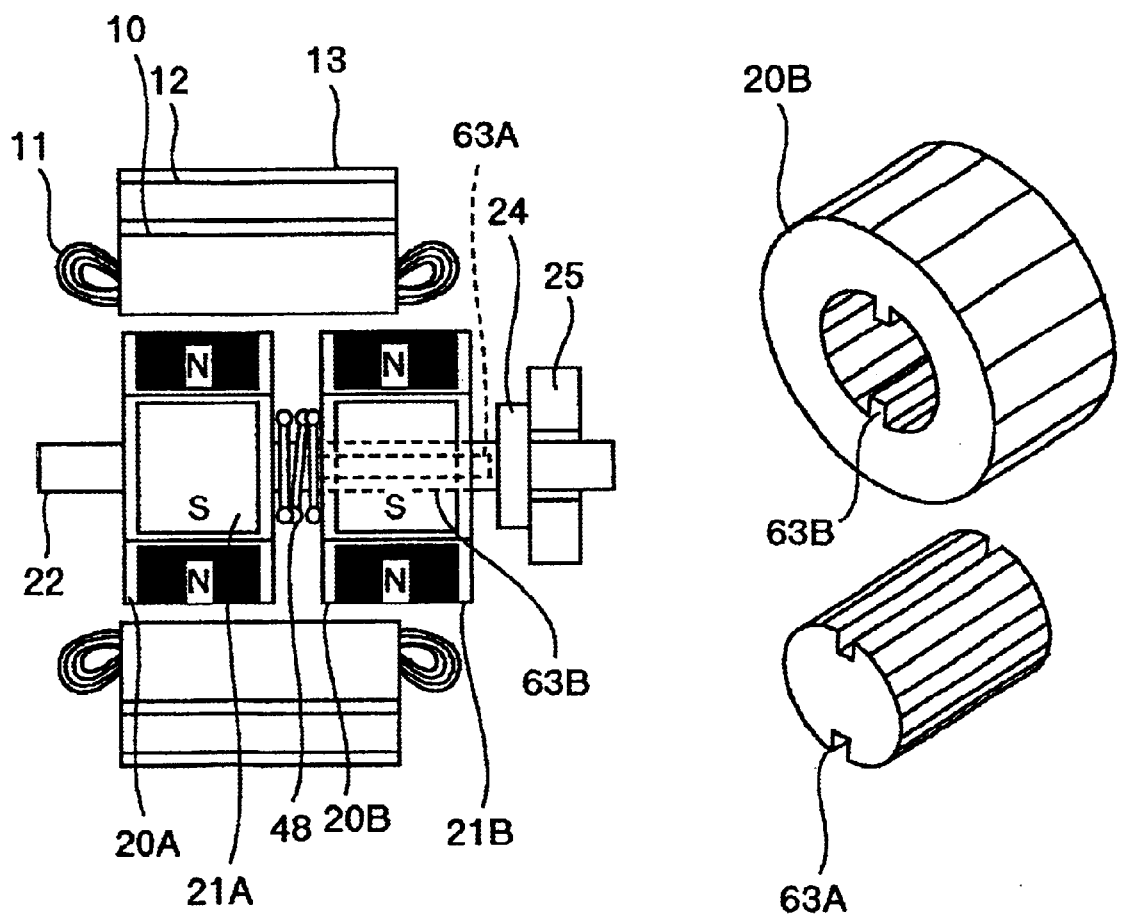
FIG. 17 is a sectional view showing the configuration of the permanent-magnet type synchronous rotational electric machine according to a ninth embodiment of the present invention.

A ninth embodiment of the present invention will be described below with reference to FIG. 17. FIG. 17 shows the configuration of a permanent magnet type synchronous rotational electric machine according to this embodiment. This embodiment differs from the above-described embodiments and is configured so that the second rotor portion 20B is moved only axially relative to the first rotor portion 20A.

Therefore, axially continuous convex portions 63B are formed in two opposite places of the inner circumferential side of the second rotor portion 20B. Concave-like grooves 63A which is axially continuous and which is capable of being fitted into the convex portions of the second rotor portion 20B are formed in portions of the outer circumferential side of the shaft 22 opposite to the convex portions 63B of the second rotor portion 20B. Hence, the grooves 63A of the shaft 22 guide the convex portions 63B of the second rotor portion 20B so that the second rotor portion 20B moves around the shaft 22 and thereby moves axially. The spring 48 which is an elastic body is provided between the first rotor portion 20A and the second rotor portion 20B. The spring 48 generates force to push the second rotor portion 20B toward a side opposite to the first rotor portion 20A side. A rotor position changing means is provided on a side of the second rotor portion 20B opposite to the first rotor portion 20A side. The rotor position changing means is constituted by a combination of the stopper 24 and the actuator 25 which serves as a servo mechanism and also as a mechanism for driving the stopper 24.

In this embodiment configured as described above, the actuator 25 is driven in accordance with the rotational speed (angular velocity) of the permanent magnet type synchronous rotational electric machine to change the axial position of the stopper 24 to thereby move the second rotor portion 20B axially. Hence, the permanent magnet type synchronous rotational electric machine can be operated as an electric motor or as an electric power generator. That is, in a low rotational speed of the rotational electric machine, the stopper 24 is moved toward the second rotor portion 20B side to thereby make it possible to move the second rotor portion 20B toward the first rotor portion 20A side against the force of the spring 48. Accordingly, the first rotor portion 20A and the second rotor portion 20B can be brought close to each other, so that the permanent magnet type synchronous rotational electric machine can be operated as an electric motor. In a high rotational speed region of the rotational electric machine, the stopper 24 is moved toward a side opposite to the second rotor portion 20B side to thereby make it possible to move the second rotor portion 20B toward a side opposite to the first rotor portion 20A side by the force of the spring 48. Accordingly, the second rotor portion 20B can be separated from the first rotor portion 20A, so that the permanent magnet type synchronous rotational electric machine can be operated as an electric power generator.

Figure 18:
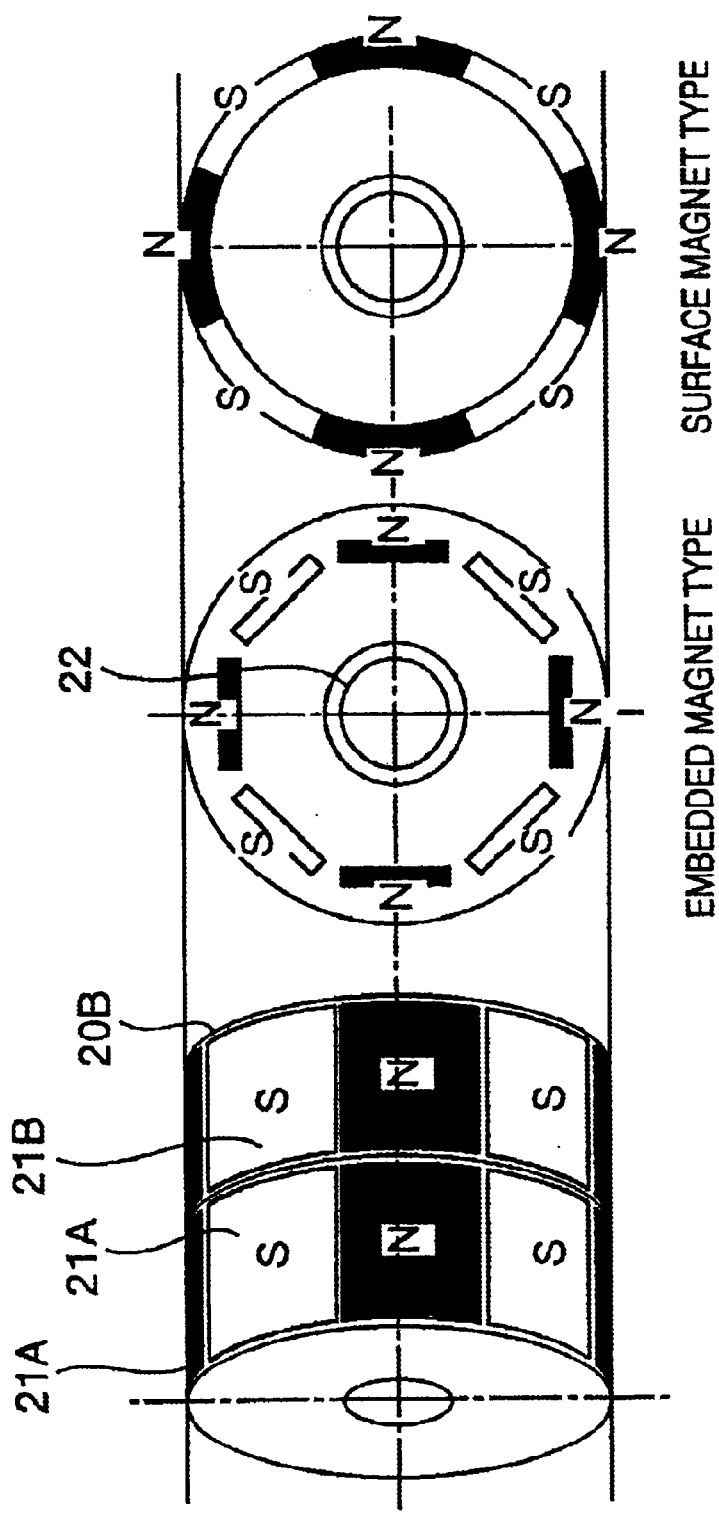
FIG. 18 is a view for explaining the configuration of rotor portions in a permanent-magnet type synchronous rotational electric machine.

Although the above description has been made about the case where the permanent magnet type synchronous rotational electric machine is provided as a four-pole motor by way of example, the configuration of the above embodiments is not limited to the four-pole motor. For example, the present invention may be applied to a two-pole motor, a six-pole motor, an eight-pole motor shown in FIG. 18, or a motor having a larger number of poles than 8 poles. As the method of attaching permanent magnets to a rotor, either a so-called embedded magnet type in which permanent magnets are attached to the inside of the rotor, or a so-called surface magnet type in which permanent magnets are attached to a surface of the rotor may be used as shown in FIG. 18.

Embodiment 10

Figure 19:
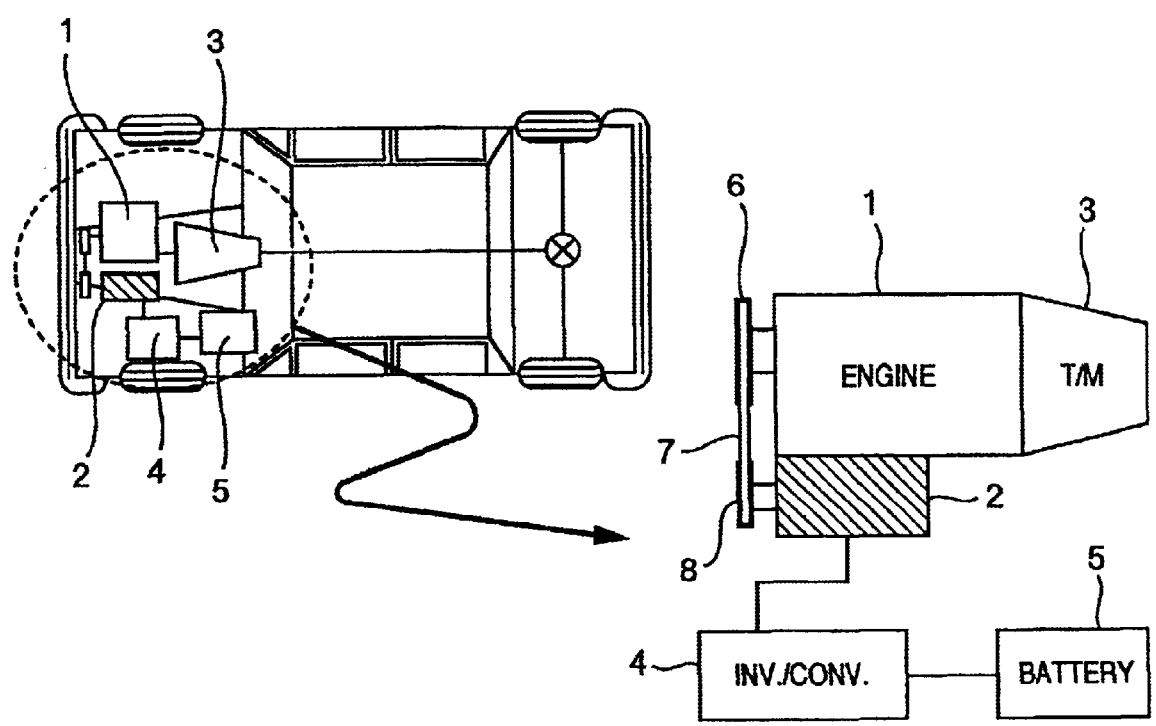
FIG. 19 is a pan view showing the configuration of arrangement of a car driving apparatus according to a tenth embodiment of the present invention.

A tenth embodiment of the present invention will be described below with reference to FIG. 19. FIG. 19 shows the configuration of arrangement of a car driving apparatus according to this embodiment. In the driving apparatus according to this embodiment, a crank pulley 6 of the engine 1 and a pulley 8 which is connected to the shaft of the permanent magnet type synchronous rotational electric machine 2 are connected to each other by a metal belt 7. Hence, the engine 1 and the permanent magnet type synchronous rotational electric machine 2 are arranged side by side. Incidentally, a chain or a toothed belt may be used for connecting the crank pulley 6 and the pulley 8 to each other. The crank pulley 6 and the pulley 8 may be replaced by gears for connecting the engine 1 and the permanent magnet type synchronous rotational electric machine 2 to each other. Any one of the permanent magnet type synchronous rotational electric machines according to the first to ninth embodiments is used as the permanent magnet type synchronous rotational electric machine 2. Incidentally, in FIG. 19, the reference numeral 3 designates a transmission directly connected to the engine 1; and 5, a battery electrically connected to the permanent magnet type synchronous rotational electric machine 2 through the electric power converter 4. The electric power converter 4 has both the function of an inverter and the function of a converter. In the car driving apparatus according to this embodiment, the permanent magnet type synchronous rotational electric machine 2 may be used as an electric motor or as an electric power generator singly. Alternatively, it can be used as a motor generator.

According to this embodiment, a speed change mechanism having a certain velocity ratio may be provided between the engine 1 and the permanent magnet type synchronous rotational electric machine 2 by the crank pulley 6, the metal belt 7 and the pulley 8. When, for example, the radius ratio of the crank pulley 6 to the pulley 8 is set as 2:1, the permanent magnet type synchronous rotational electric machine 2 can be rotated at a velocity twice as fast as that of the engine 1, and the torque of the permanent magnet type synchronous rotational electric machine 2 can be made half of torque required for starting the engine 1 at the time of starting the engine 1. Hence, the size of the permanent magnet type synchronous rotational electric machine 2 can be reduced.

Embodiment 11

Figure 20A:
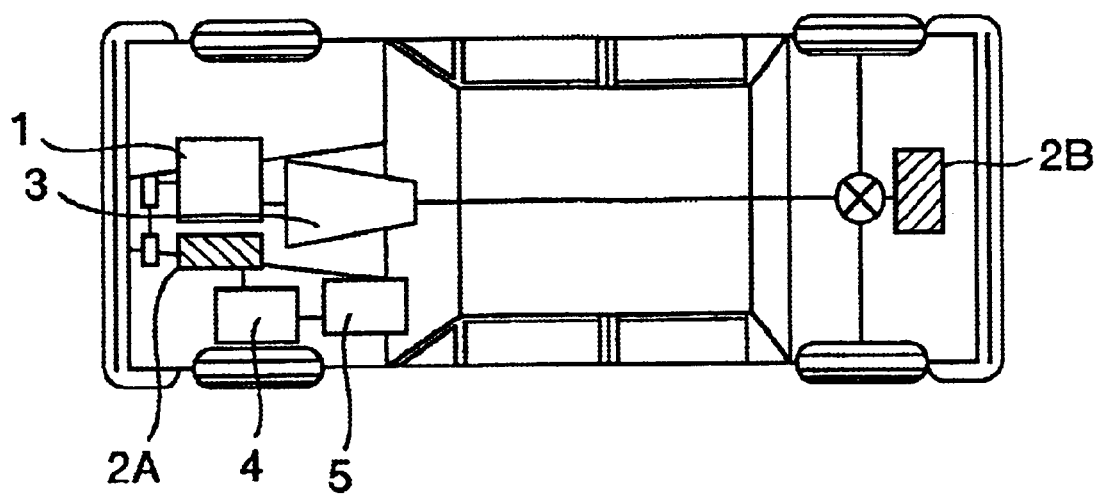
FIGS. 20A and 20B are plan views showing the configuration of arrangement of a four-wheel driven car driving apparatus according to an eleventh embodiment of the present invention.
Figure 20B:
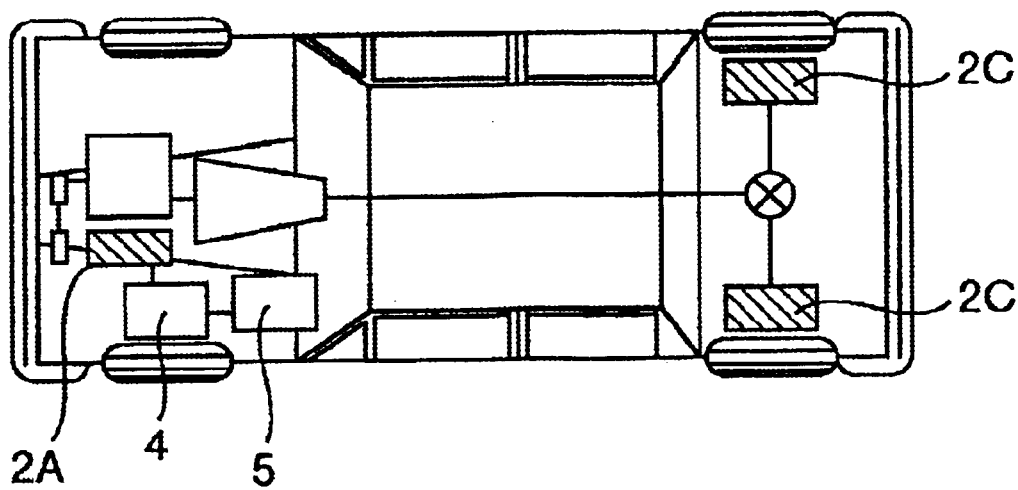

An eleventh embodiment of the present invention will be described below with reference to FIGS. 20A and 20B. FIGS. 20A and 20B show the configuration of arrangement of a car driving apparatus according to this embodiment. This embodiment is a modified example of the tenth embodiment and shows the case where, in addition to a permanent magnet type synchronous rotational electric machine 2A connected to the engine 1, any one of the permanent magnet type synchronous rotational electric machines according to the first to ninth embodiments is mounted on the car for driving wheels (rear wheels) different from wheels (front wheels) driven by the engine 1 as shown in FIGS. 20A and 20B. That is, this embodiment shows the case where the present invention is applied to a four-wheel driven car.

In FIG. 20A, a driving shaft of wheels (rear wheels) different from wheels (front wheels) driven by the engine 1 is connected to a permanent magnet type synchronous rotational electric machine 2B by gears. Incidentally, the permanent magnet type synchronous rotational electric machine 2B may be combined with a differential gear to be driven together with the engine 1 and the permanent magnet type synchronous rotational electric machine 2A. In FIG. 20B, permanent magnet type synchronous rotational electric machines 2C are connected to wheels (rear wheels) different from wheels (front wheels) driven by the engine 1, that is, as a wheel-in-motor type.

Embodiment 12

Figure 21A:
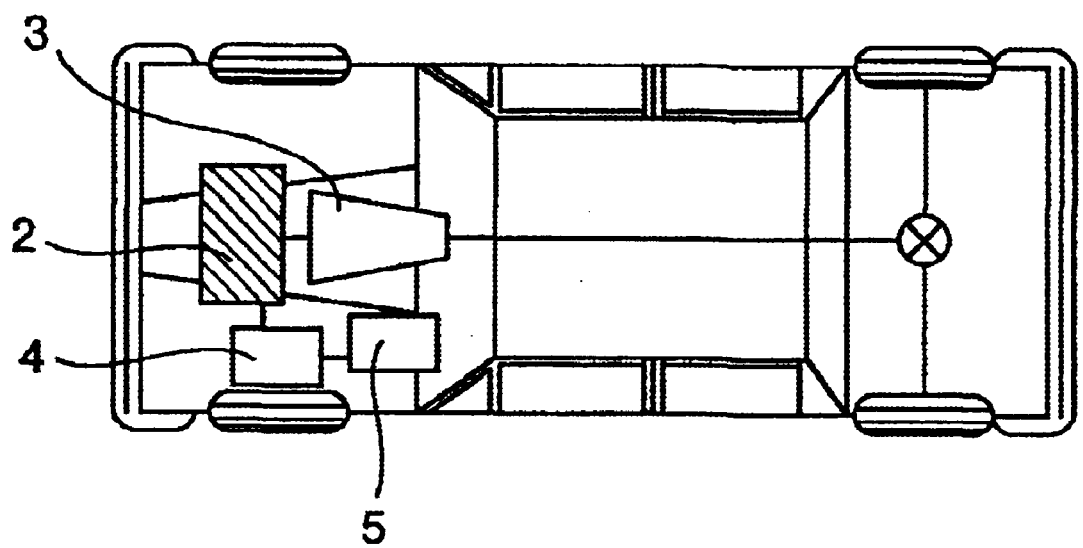
FIGS. 21A and 21B are plan views showing the configuration of arrangement of an electric car driving apparatus according to a twelfth embodiment of the present invention.
Figure 21B:
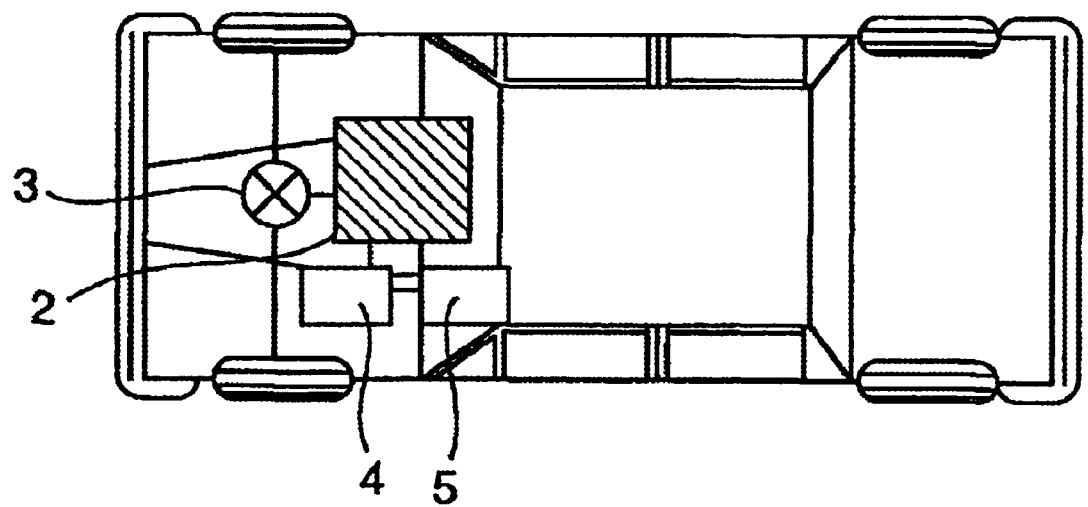

A twelfth embodiment of the present invention will be described below with reference to FIGS. 21A and 21B. FIGS. 21A and 21B show the configuration of arrangement of an electric car driving apparatus according to this embodiment. The electric car is a vehicle having no internal combustion engine. In the electric car, the permanent magnet type synchronous rotational electric machine 2 is driven by electric power of the battery 5 supplied through the electric power converter 4 to drive the vehicle. In FIG. 21A, the permanent magnet type synchronous rotational electric machine 2 is connected to the driving shaft of the rear wheels through the transmission 3. In FIG. 21B, the permanent magnet type synchronous rotational electric machine 2 is directly connected to the driving shaft of the front wheels.

According to the present invention described above, it is possible to provide a rotational electric machine capable of obtaining high torque characteristic in a low rotational speed region and high output electric power generating characteristic in a high rotational speed region, and to provide a vehicle on which the rotational electric machine is mounted. Further, it is possible to provide a rotational electric machine capable of obtaining high torque characteristic in a low rotational speed region and high output electric power generating characteristic in a high rotational speed region as well as capable of improving mechanical reliability, and to provide a vehicle on which the rotational electric machine is mounted.

What is claimed is:

1. A rotational electric machine comprising:
   a stator having windings; and
   a split rotor rotatably disposed on an inner circumferential side of said stator and separated from said stator through an air gap, said split rotor being axially divided into two rotor portions, each having different-polarity field magnets disposed alternately in a rotations direction;

one of said rotor portions including a changing mechanism for changing an axial position of said one rotor portion relative to an axial position of the other rotor portion in accordance with a magnetic action force produced between said field magnets of said two rotor portions and a direction torque induced on said split rotor;

said one rotor portion being supported from axially opposite sides by a support mechanism.

2. A rotational electric machine according to claim 1, wherein said other rotor portion is fixed to a rotation shaft, said one rotor portion is configured so as to be separable from said rotation shaft, and thread portions are provided on an inner circumferential side of said one rotor portion and on said rotation shaft respectively so as to be thread-engaged with each other.

3. A rotational electric machine according to claim 1, wherein said other rotor portion is fixed to a rotation shaft, said one rotor portion is configured so as to be separable from said rotation shaft, a ring member having a thread portion in an inner circumferential side thereof, is provided on an inner circumferential side of said one rotor portion through a non-magnetic member, and a thread portion is provided on said rotation shaft so that said thread portions are thread-engaged with each other.

4. A rotational electric machine according to claim 3, wherein said non-magnetic member is constituted by a cylindrical member having electrical resistivity higher than that of iron.

5. A rotational electric machine according to claim 3, wherein said ring member is constituted by a nut.

6. A rotational electric machine according to claim 1, wherein said other rotor portion is fixed to a rotation shaft, said one rotor portion is configured so as to be separable from said rotation shaft, a cylindrical protrusive portion is provided on a side surface of said one rotor portion; a recess portion is provided in a side surface of said other rotor portion so that said recess portion is capable of receiving said protrusive portion, a ring member having a first thread portion in an inner circumferential side thereof is provided on an inner circumferential side of said one rotor portion through a non-magnetic member, and a second thread portion is provided on said rotation shaft so that said first and second thread portions are thread-engaged with each other.

7. A rotational electric machine according to claim 1, wherein said support mechanism has an elastic body provided between said rotor portions, and another elastic body provided on a side of said one rotor portion.

8. A rotational electric machine according to claim 1, wherein said support mechanism has an elastic body provided between said rotor portions, a support member provided on a side of said one rotor portion so as to be axially movable along said rotation shaft, and a drive mechanism for moving said support member along said rotation shaft.

9. A rotational electric machine according to claim 8, wherein said drive mechanism is constituted by a servo mechanism.

10. A rotational electric machine according to claim 1, wherein said support mechanism relaxes an axially moving force of said one rotor portion.

11. A rotational electric machine according to claim 1, wherein a size of said air gap between said one rotor portion and said stator is different from a size of said air gap between said other rotor portion and said stator.

12. A rotational electric machine according to claim 1, wherein a size of said air gap between said one rotor portion and said stator is selected to be larger than a size of said air gap between said other rotor portion and said stator.

13. A rotational electric machine according to claim 1, wherein a lead angle of a current supplied to said windings is corrected in accordance with displacement in compound magnetic pole position of the field magnets disposed in said one rotor portion and the field magnets disposed in said other rotor portion.

14. A rotational electric machine according to claim 1, wherein a quantity of axial displacement of said one rotor portion relative to said other rotor portion is detected so that a lead angle of a current supplied to said windings is corrected on a basis of said quantity of axial displacement.

15. A rotational electric machine comprising:

a stator having windings; and a split rotor rotatably disposed on an inner circumferential side of said stator through an air gap and axially divided into two rotor portions, said rotor portions having different-polarity field magnets disposed alternately in a rotational direction;

one of said rotor portions including a changing mechanism for changing a phase of compound magnetic poles of said field magnets relative to that of magnetic poles of the other rotor portion in accordance with a magnetic action force produced between said field magnets of said two rotor portions and a direction of torque induced on said split rotor;

said one rotor portion being supported from axially opposite sides by a support mechanism.

16. A rotational electric machine comprising:

a stator having windings; and a split rotor rotatably disposed on an inner circumferential side of said stator through an air gap and axially divided into two rotor portions, said rotor portions having different-polarity field magnets disposed alternately in a rotational direction;

one of said rotor portions including a changing mechanism for changing an axial position of said one rotor portion relative to that of the other rotor portion while shifting a magnetic pole center of said field magnets disposed in said one rotor portion and another magnetic pole center of said field magnets disposed in said other rotor portion in accordance with a magnetic action force produced between said field magnets of said two rotor portions and a direction of torque induced on said split rotor, said one rotor portion being supported from axially opposite sides by a support mechanism.

17. A rotational electric machine comprising:

a stator having windings; and a split rotor rotatably disposed on an inner circumferential side of said stator through an air gap and axially divided into two rotor portions, said rotor portions having different-polarity field magnets disposed alternately in a rotational direction;

one of said rotor portions including a changing mechanism for changing a phase of magnetic poles of said field magnets relative to that of magnetic poles of said field magnets of the other rotor portion, while shifting a magnetic pole center of said field magnets disposed in said one rotor portion and another magnetic pole center of said field magnets disposed in said other rotor portion in accordance with a magnetic force produced between said filed magnets of said two rotor portions and a direction of torque induced on said split rotor, said one rotor portion being supported from axially opposite sides by a support mechanism.

18. A rotational electric machine comprising:

a stator having windings; and a split rotor rotatably disposed on an inner circumferential side of said stator through an air gap and axially divided into two rotor portions, said rotor portions having different-polarity field magnets disposed alternately in a rotational direction;

one of said rotor portions including a changing mechanism for changing an axial position of said one rotor portion relative to that of the other rotor portion while truing up a magnetic pole center of said field magnets disposed in said one rotor portion and another magnetic pole center of said field magnets disposed in said other rotor portion in accordance with a magnetic action force produced between said field magnets of said two rotor portions and a direction of torque induced on said split rotor, said one rotor portion being supported from axially opposite sides by a support mechanism.

19. A rotational electric machine comprising:

a stator having windings; and a split rotor rotatably disposed on an inner circumferential side of said stator through an air gap and axially divided into two rotor portions, said rotor portions having different-polarity field magnets disposed alternately in a rotational direction;

one of said rotor portions including a changing mechanism for changing a phase of compound magnetic poles of said field magnets relative to that of magnetic poles of said field magnets of the other rotor portion while truing up a magnetic pole center of said field magnets disposed in said one rotor portion and another magnetic pole center of said field magnets disposed in said other rotor portion in accordance with a magnetic action force produced between said field magnets of said two rotor portions and a direction of torque induced on said split rotor, said one rotor portion being supported from axially opposite sides by a support mechanism.

20. A rotational electric machine comprising:

a stator having windings;

a rotor having field magnets, said field magnets being constituted by a first field magnet having different-polarity magnetic poles arranged successively in a rotational direction and a second field magnet being rotatable relative to said first field magnet and having different-polarity magnetic poles arranged successively in said rotational direction;

said first and second field magnets being provided opposite to magnetic poles of said stator and having a mechanism for changing a phase of compound magnetic poles of said first and second field magnets relative to that of magnetic poles of said first field magnet in accordance with a direction of torque of said rotor; said mechanism for changing the phase in accordance with the direction of torque having means for truing up a magnetic pole center of said first field magnet and another magnetic pole center of said second field magnet on a basis of balance between the direction of torque generated in said rotor and magnetic action force between said first and second field magnets, and means for shifting the magnetic pole centers of said first and second field magnets whenever the direction of torque generated in said rotor is inverted; said second field magnet being supported from axially opposite sides by a support mechanism.

21. A vehicle comprising:

an internal combustion engine for driving wheels;

a battery for charging and discharging electric power;

a rotational electric machine mechanically linked with a crank shaft of said internal combustion engine and driven by electric power supplied from said battery to thereby drive said internal combustion engine and driven by motive power from said internal combustion engine to thereby generate electric power to be supplied to said battery;

an electric power converter for controlling said rotational electric machine;

a control unit for controlling said electric power converter;

said rotational electric machine being constituted by a rotational electric machine according to any one of claims 1 through 20.

22. A vehicle according to claim 21, wherein said rotational electric machine is operated as an electric motor at a low rotational speed of said internal combustion engine and as a power generator at a high rotational speed of said internal combustion engine.

23. A vehicle comprising:

a battery for charging and discharging electric power;

a rotational electric machine supplied with electric power from said battery to thereby drive wheels; an electric power converter for controlling said rotational electric machine;

a control unit for controlling said electric power converter;

said rotational electric machine being constituted by a rotational electric machine according to any one of claims 1 through 20.

24. A vehicle comprising:

an internal combustion engine for driving front or rear wheels;

a battery for charging and discharging electric power;

a rotational electric machine driven by electric power supplied from said battery to thereby drive said front or rear wheels;

an electric power converter for controlling said rotational electric machine;

a control unit for controlling said electric power converter;

said rotational electric machine being constituted by a rotational electric machine according to any one of claims 1 through 20.

25. A vehicle comprising:

an internal combustion engine for driving wheels;

a battery for charging and discharging electric power;

a rotational electric machine mechanically linked with a crank shaft of said internal combustion engine and driven by electric power supplied from said battery to thereby drive said internal combustion engine;

an electric power converter for controlling said rotational electric machine;

a control unit for controlling said electric power converter;

said rotational electric machine being constituted by a rotational electric machine according to any one of claims 1 through 20.

26. A vehicle comprising:

an internal combustion engine for driving wheels;

a battery for charging and discharging electric power;

a rotational electric machine mechanically linked with a crank shaft of said internal combustion engine and driven by motive power from said internal combustion engine to thereby generate electric power to be supplied to said battery;

an electric power converter for controlling said rotational electric machine;

a control unit for controlling said electric power converter;

said rotational electric machine being constituted by a rotational electric machine according to any one of claims 1 through 20.

* * * * *